United States Patent [19]
Iwayama et al.

[11] Patent Number: 5,832,083
[45] Date of Patent: Nov. 3, 1998

[54] METHOD AND DEVICE FOR UTILIZING DATA CONTENT

[75] Inventors: Noboru Iwayama; Naoya Torii; Takayuki Hasebe; Masahiko Takenaka; Masahiro Matsuda, all of Kawasaki, Japan

[73] Assignee: Fujitsu Limited, Kawasaki, Japan

[21] Appl. No.: 509,285

[22] Filed: Jul. 31, 1995

[30] Foreign Application Priority Data

Sep. 9, 1994 [JP] Japan .................................. 6-252623

[51] Int. Cl.⁶ ...................................................... H04K 1/00
[52] U.S. Cl. ................................................. 380/4; 380/25
[58] Field of Search ................................... 380/4, 25, 21

[56] References Cited

U.S. PATENT DOCUMENTS

| | | |
|---|---|---|
| 4,247,106 | 1/1981 | Jeffers et al. . |
| 4,439,670 | 3/1984 | Bassett et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,949,257 | 8/1990 | Orbach . |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite et al. . |
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |

OTHER PUBLICATIONS

Japanese Patent Laid–Open Publication No. 57–127249, Aug. 7, 1982 (equivalent to Japanese patent Publication No. 61–22815).

Japanese Patent Laid–Open Publication No. 5–89363, Apr. 9, 1993.

Japanese Patent Laid–Open Publication No. 5–266575, Oct. 15, 1993.

Japanese Patent Laid–Open Publication No. 5–298085, Nov. 12, 1993.

Japanese Patent Laid–Open Publication No. 6–95871, Apr. 8, 1994.

*Primary Examiner*—David G. Cain
*Attorney, Agent, or Firm*—Staas & Halsey

[57] ABSTRACT

The present invention provides a data content utilizing device having data storing section for storing information obtained by encoding data contents and content identification information specifying the data contents, a utilization permitting device for generating utilization permission information used to decode data contents desired by a user and information converting section for loading data contents requested by the user from the data storing section and decoding the data contents only in the case where utilization permission information is generated by the utilization permitting device.

43 Claims, 21 Drawing Sheets

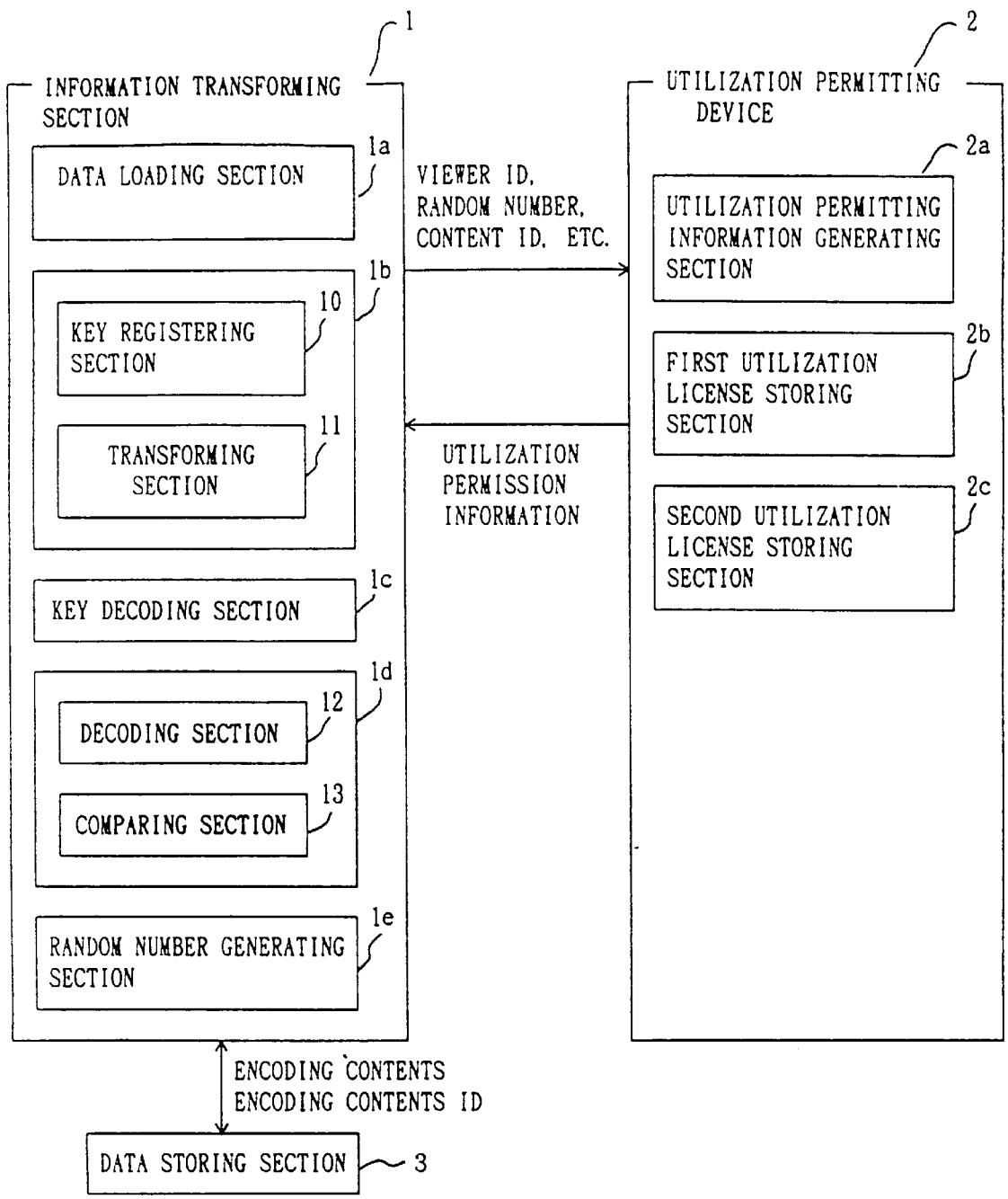
F I G. 1

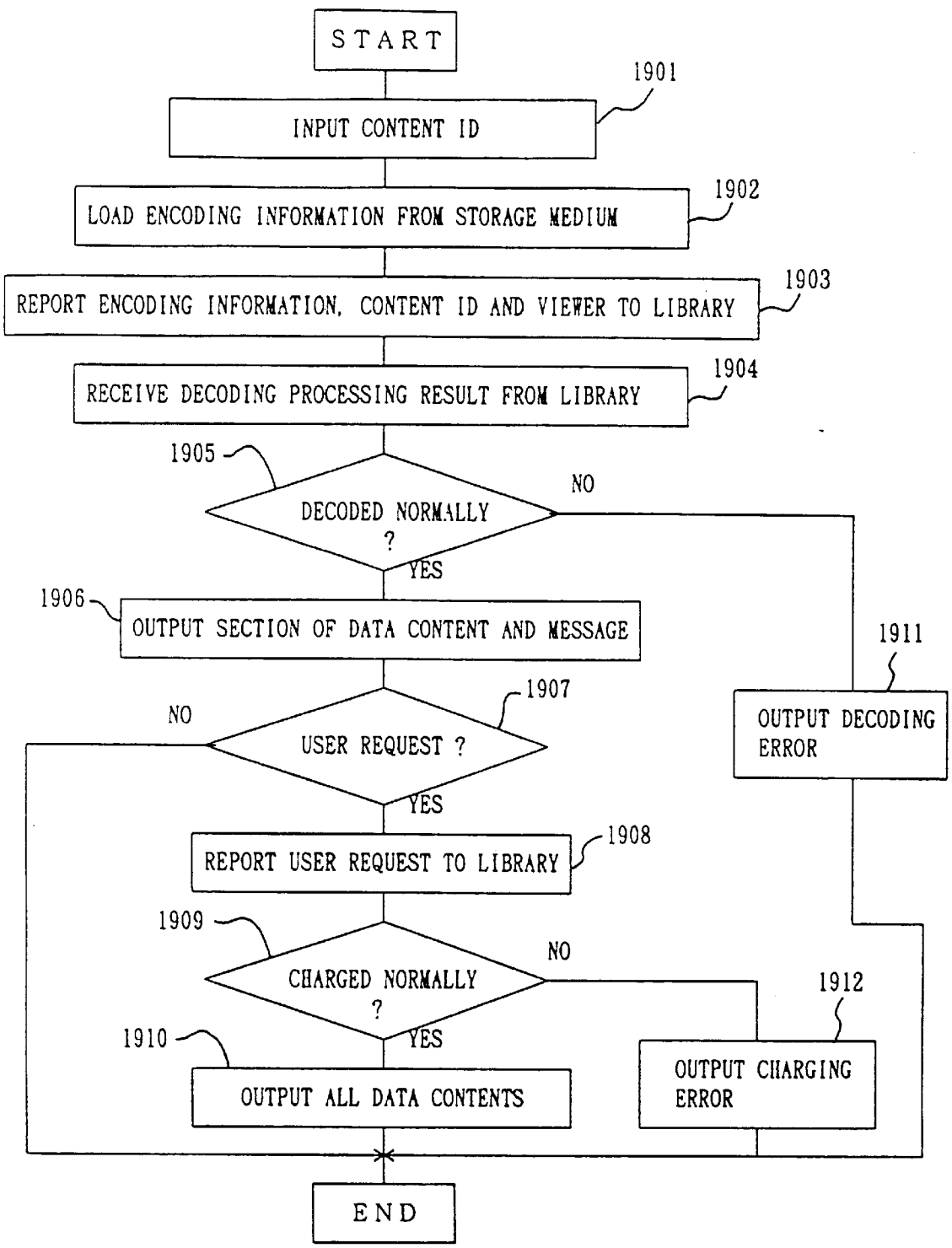
F I G. 1 9

METHOD AND DEVICE FOR UTILIZING DATA CONTENT

BACKGROUND OF THE INVENTION

1. Field of the Invention

The present invention relates to a technology effective for and applicable to a distribution system for software such as computer programs, video works and etc., and in particular, distribution of such software as digitized information.

2. Description of the Related Art

Recently there has been a conspicuous technological advance in terms of storage media for storing software, and, in particular, such media as CD-ROM or the like capable of storing a large amount of digital information have begun to be used. Accordingly, it is expected that computer programs, images, sounds, etc., will be converted into digital information, stored in large-capacity storage media, and such media will be sold as commodities.

In fact, a situation has already been emerging in that CD-ROMs storing video works as they are which used to be supplied in video tapes are now sold or CD-ROMs storing game software utilizing the interactive characteristic of a CD-ROM(two-way characteristic) are distributed to the market.

It is in fact quite easy to copy digital information of video works, game software, etc., onto other media without any reduction in quality as in the case of analog information. There is a possibility, however, that the profits of manufacturers will suffer due to such copying. Even for users who have only a little knowledge of operating system commands, it is easy to copy software only if they have large-capacity and rewritable optical magnetic disks, magnetic disk devices, etc.

In order to deal with such a problem, most of the manufacturers prohibit renting of digital information media. If they want to utilize such software, the users have to buy storage media storing the software. However, they more often than not hesitate to do so for the following reasons:

(1) Selling prices of software storage media are very high.
(2) There is no guarantee that software for sale will be really what they want.
(3) There is no guarantee that software storage media for sale will be usable for the hardware they have.

Giving consideration to the reasons (1) to (3) mentioned above, the manufacturers have been selling CD-ROMs storing a plurality of pieces of software with functional limits attached. By actually using the software with functional limits attached, the end users in turn are allowed to identify if it is really what they desire. When they find that the used software is the one they require, the end users will pay normal fees. The manufacturers will report to the end users codes for releasing the functional limits of the software. Then, the end users will release the limits by using the codes given by the manufacturers. In this way, the end users will be allowed to utilize all the functions of the software.

As a method of limiting utilization, there exists the one of encoding software and obtaining permission information which is a basis for decoding in return for payment of fees. This method provides within software a module for respectively generating user keys for individual users and a module for generating software decoding keys by decoding permission information based on these user keys and generating sentence type software by decoding software based on these decoding keys. In this way, the end users who have paid normal fees will be allowed to utilize encoded software by decoding it.

However, by the system mentioned above, there is a possibility that once they obtain permission information, the users who have paid normal fees might provide it to the other users who have not paid the fees, and thus data contents might be illegally used.

Further, at a rental system of data contents, the users watch parts of data contents which they have borrowed without knowing the content. Even if the users stop using them because they are different from what they wanted, they will be charged.

Under these circumstances, it is an object of the present invention to provide a technology capable of preventing illegal utilization of software, improving security checking for software utilization and efficiently carrying out charging management.

SUMMARY OF THE INVENTION

In order to solve the problems described above, the present invention adopts the following construction.

In this description, data contents refers to software including computer programs, image data such as movies, and other moving picture data, and audio data of music, etc.

First, embodiments of data content utilizing devices according to the present invention will be described.

The first embodiment of the data content utilizing devices according to the present invention includes a data storing section an, information converting section, and a utilization permitting device.

The data storing section indicates a medium for storing software of CD-ROM, etc., or an area for storing data in a medium. This data storing section stores at least one kind of information made by encoding data contents and content identification information specifying individual data contents. For example, the data storing section stores sentence type content identification information for every encoded data contents, and based on this content identification information the respective data contents can be retrieved.

The information converting section is, for example, a module incorporated in a device for outputting data contents and can be constructed by a viewer and a library. This information converting section is for decoding the data contents which the users want and outputting them to a screen or a speaker. It is also provided with a function for preventing filing of data contents. As a method of preventing filing, there exists the one by which the viewer is not provided with a file output routine.

The utilization permitting device is, for example, an outside device connected to a reproducing device for reproducing/outputting data contents, and it may be connected to each reproducing device or shared by a plurality of reproducing devices via communication networks. The utilization permitting device generates utilization permission information of data contents stored in the data storing means. This utilization permission information will be necessary when the information converting means decodes data contents.

The operation of the data content utilizing device will be described hereinbelow.

The information converting section of the data content utilizing device will retrieve data contents corresponding to content identification information from the data storing section when the user inputs the content identification information of data contents which he desires. Then, the information converting section will report the content identification information and information converting section identification information to the utilization permitting device. Upon receiving the content identification information and the information converting section identification information, the utilization permitting device will generate utilization permission information using them. Then, it will report the utilization permission information to the information converting section.

The information converting section will generate a key decoding key using the information converting section identification information. It will further decode the key decoding key by the utilization permission information received from the utilization permitting device and generate a decoding key.

Then, the information converting section will decode encoded data contents and encoded content identification information by the decoding key. When this decoding is completed, it will compare the decoded content identification information and the user content identification information to see if they coincide. Only when the decoded content identification information and the content identification information input by the user are found to be coincident, it will output the decoded data contents.

Further, in the case where the decoded content identification information and the content identification information input by the user are identified to be coincident, the information converting section may be made to output the decoded data contents for a specified period of time and output the above message. Then, if the user requests to use the data contents within a specified period of time, the data contents will be output continuously even after the passage of a certain period of time. On the other hand, if the user makes no requests for utilizing the data contents or if there is no response from the user within a specified period of time, the output of the data contents will be terminated after the passage of a certain period of time.

Further, in the case where the detected content identification information and the content identification information input by the user are identified to be non-coincident, or in the case where decoding has not been operated normally, the information converting section will be made to output a message indicating a decoding error.

The second embodiment of the present invention solving the problem previously described according to the present invention will be described hereinbelow.

The second embodiment of the data content utilizing devices includes a data storing section, a utilization license storing section and an information converting section.

The data storing section, as similar to the case in the first, stores encoded data contents and encoded content identification information. This data storing section indicates, for example, such a storage medium as a CD-ROM, a video tape, a cassette tape or the like, or a storing area in such a medium.

The utilization license storing section registers a utilization key for each content identification information used to identify individual data contents.

The information converting section is for encoding data contents which the user requests and outputting them to a screen or a speaker.

The operation of the data content utilizing device will be described hereinbelow.

The information converting section of the data content utilizing device will retrieve contents corresponding to content identification information from the data storing section, when the user inputs the content identification information of data contents which he wants. At the same time, it will retrieve utilization key information corresponding to the content identification information from the utilization license storing section.

Then, the information converting section will load key information registered in a key registering section and generate a key decoding key. Further, it will generate a decoding key by using the key decoding key and the utilization key. Then, it will decode encoded data contents by the decoding key and output them. At the time when the decoding of the data contents is finished, it will compare the decoded content identification information input by the user. Then, only of they are coincident, the data contents will be output to a screen or a speaker.

Further, the information converting section will be made to output not all but sections of them at the time of outputting decoded data contents. In such a case, as similar to the case in the first, a message will be sent to the user urging him to select either utilization or nonutilization of the data contents.

The third embodiment of the present invention solving the problem previously mentioned according to the present invention will be described hereinbelow.

The third embodiment of the data content utilizing devices includes a data storing sections, an information converting sections and a utilization permitting device.

Description of the data storing section will be omitted, as it is similar to the one in the case of the first.

The information converting section decodes data contents which the user requests and outputs them to a screen or a speaker.

The utilization permitting device generates the utilization permission information of data contents, and manages the charging information thereof. This device is provided with a first utilization license storing section for storing a decoding key for each content identification information and a second utilization license storing section for storing a certification key for each information converting means identification information.

The operation of the data content utilizing device will be described hereinbelow.

When the user inputs the content identification information of data contents which the user wants, the information converting section of the data content utilizing device will retrieve encoded data contents and encoded content identification information corresponding to the content identification information from the data storing content. Then, it will transmit the content identification information input by the user and information converting section identification information to the utilization permitting device. It will also load specified key information from the key registering section, and generate a key decoding key using this key information and the information converting section identification information.

On the other hand, the utilization permitting device will retrieve a decoding key corresponding to the content identification information from the first utilization license storing section. It will further retrieve a certification key corresponding to the information converting section identification information from the second utilization license storing section. Then, it will generate utilization permission information by encoding the decoding key with the certification key and report it to the information converting section. At this time, the information converting section will decode the utilization information received from the utilization permitting device by the key decoding key and generate a decoding key. Then, it will decode the encoded data contents and the encoded content identification information by the decoding key. It will compare the decoded content identification information and the content identification information input by the user to see if they coincide. If they coincide, it will report normal finishing of the decoding to the utilization permitting device. The utilization permitting device, upon receiving the report of normal finishing of the decoding from the information converting section, will renew the charging information of the data contents.

On the other hand, in the case where the decoded content identification information and the content identification information input by the user are found to be non-coincident, the information converting section will report abnormal finishing of the decoding to the utilization permitting device.

The utilization permitting device, upon receiving the abnormal finishing of decoding from the information converting section, will not renew the charging information of the data contents.

Further, the utilization permitting device will give information for identifying whether the charging information has been renewed normally or not to the information converting section.

The information converting section will identify whether the charging has been made normally or not consulting the charging result received from the utilization permitting device. Then, it will output the decoded data contents if they have been normally decoded and the charging information has been normally renewed.

Further, if at least either the decoding of the data contents or the renewing of the charging information has not been normally operated, the information converting section will output an error.

The utilization methods according to the present invention will be described hereinbelow.

According to the first of the utilization methods of the present invention, when the content identification information of data contents requested by the user is input, data contents corresponding to the content identification information will be retrieved from the data storing section.

Then, at a utilization permitting step, utilization permission information will be generated using the content identification information and information converting section identification information.

Then, a key decoding key will be generated and a decoding key will be generated by decoding the key decoding key with the utilization permission information.

Further, encoded data contents and encoded content identification information will be decoded by the decoding key and comparison will be made between the decoded content identification information and the content identification information input by the user to see if they coincide. Here, if they are found to be coincident, the decoded data contents will be output.

In the case where the decoded content identification information and the content identification information are coincident, it may be possible to output not all but parts of the data contents. At this time, a message must be sent to the user asking him to select either utilization or nonutilization of the data contents. Then, if he selects to use the data contents, all of the data contents will be output.

Furthermore, in the case where the decoded content identification information and the content identification information input by the user are coincident, it may be possible to output the decoded data contents with the message mentioned above for a specified period of time. Then, if the user requests to use the data contents within a certain period of time, the data contents will be continuously output even after the passage of the specified period of time. On the other hand, if the user makes no request to use the data contents, or if there is no response from the user within a certain period of time, outputting of the data contents will be terminated after the passage of the specified period of time.

According to the second of the utilization methods of the present invention, when the user obtains the content identification information of the requested data contents, data contents corresponding to the content identification information will be retrieved from the data storing section, and at the same time utilization key information corresponding to the content identification information will be retrieved from the utilization license storing section.

Then, key information registered in the key registering section will be loaded, a key decoding key will be generated and a decoding key will be generated using the key decoding key and a utilization key. Then, encoded data contents will be decoded by the decoding key and output.

Further, at the time when the decoding of the data contends is finished, it may be possible to compare the decoded content identification information and the content identification information input by the user. In such a case, if they are found to be coincident, the decoded data contents will be output to a screen or a speaker.

Furthermore, at the time of outputting the decoded data contents, it may be possible to output not all but parts thereof. In such a case, as similar to the case by the first method, a message will be sent to the user asking him to choose either utilization or nonutilization of the data contents.

According to the third of the data content utilization methods of the present invention, when the user inputs the content identification information of data contents he wants, encoded data contents and encoded content identification corresponding to the content information will be retrieved from the data storing section. Then, specified key information will be loaded from the key registering section and a key decoding key will be generated using this key information and information converting section identification information.

At a utilization permitting step, a decoding key corresponding to the content identification information will be retrieved from the first utilization license storing section, and a certification key corresponding to the information converting section will be retrieved from the second utilization license storing section. Then, utilization permitting information will be generated by encoding the decoding key with the certification key. Further, the encoded data contents and the encoded content identification information will be decoded by the decoding key and a comparison will be made between the decoded content identification information and the content identification information input by the user to see if they coincide.

In the case where the decoding is finished normally at the information converting step, the charging information of the data contents will be renewed.

On the other hand, in the case where the decoded content identification information and the content identification information input by the user are found not to be coincident, the charging information of the data contents will not be renewed.

Further, in the case where an operation of identifying execution of normal charging is carried out, the data contents are identified to have been normally decoded and the charging information is found to have been normally renewed, the decoded data contents will be output. Still further, in the case where at least either the decoding of the data contents or the renewing of the charging information is not finished normally, a decoding error or a charging error will be output.

BRIEF DESCRIPTION OF THE DRAWINGS

FIG. 1 is a view showing the construction of a data content utilizing device according to the embodiment 1;

FIG. 19 is a flow chart showing the operation of a viewer according to the embodiment 6;

DETAILED DESCRIPTION OF THE PREFERRED EMBODIMENTS

Figure 2:
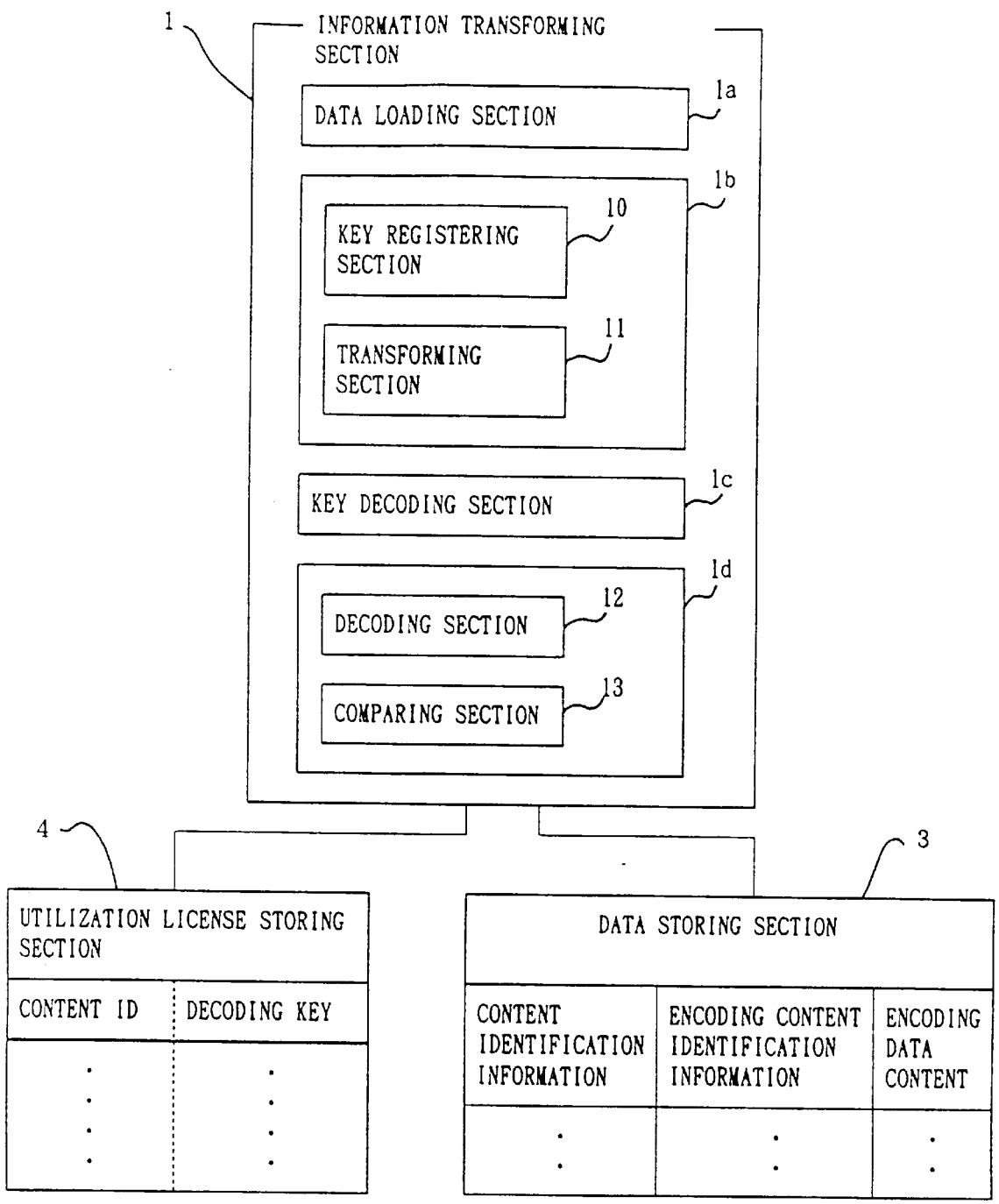
FIG. 2 is a view showing the construction of a data content utilizing device according to the embodiment 2.

A data content utilizing device according to the first embodiment of the present invention will be described with reference to the accompanying drawings.

The construction of the data content utilizing device is shown in FIG. 1.

The data content utilizing device of the present invention includes a data storing section 3, an information converting section 1 and a utilization permitting device 2.

The data storing section 3 indicates a medium for storing software such as a CD-ROM or the like or an area for storing data in a medium. It stores encoded data contents and encoded content identification information at every bits of sentence type content identification information. It allows retrieving of data contents by these bits of sentence type content identification information.

The information converting section 1 is a module incorporated in a reproducing device for reproducing/outputting data contents having a viewer and a library. This section decodes data contents requested by a user and reproduce/output them at the reproducing device. Further, it prevents filing of data contents.

The utilization permitting device 2 is an outside device connected to a reproducing device, and it is possible to connect one to each reproducing device or to share one by a plurality of reproducing devices via communication networks. It generates utilization permission information for giving permission to utilization of data contents stored in the data storing section 3. This utilization permission information will be needed when the information converting section 1 decodes encoded data contents.

Each of these components will be described hereinbelow.

The information converting section 1 includes a data loading section 1a, a key generating section 1b, a key decoding section 1c, a data decoding section 1d and a random number generating section 1e.

The data loading section 1a loads data contents requested by the user from the data storing section 3. Specifically, the data loading section 1a retrieves encoded data contents and encoded content identification information corresponding to the content identification input by the user from the data storing section 3.

The key generating section 1b generates a key decoding key using information converting section identification information specifying individual information converting sections 1. This key decoding key is encoding decoding key information used to decode an encoded decoding key while the decoding key is encoding decoding key information used to decode encoded data contents. Here, utilization permission information generated by the utilization permitting device 2 corresponds to an encoded decoding key. The key generating section 1b includes a key registering section 10 for registering specified key information beforehand and a converting section 11 for converting information converting section identification information based on a key stored therein and generating a key decoding key.

The key decoding section 1c decodes utilization permission information given by the utilization permitting device 2 using a key decoding key generated by the key generating section 1b and generates a decoding key used to decode encoded data contents.

The data decoding section 1d decodes encoded data contents and encoded content identification information loaded by the data loading section 1a based on a decoding key generated by the key decoding section 1b. This section 1d includes a decoding section 12 for decoding encoded data contents and encoded content identification information by a decoding key generated by the key decoding section 1c and a comparing section 13 for comparing decoded content identification information and content identification information input by the user and giving permission to outputting of the decoded data contents only if they coincide.

The random number generating section 1e is for generating random numbers.

Further, the utilization permitting device 2 receives information converting section identification information, content identification information and random numbers from the information converting section 1 and generate utilization permission information based on these bits of information. The device 2 includes a utilization permission information generating section 2a, a first utilization license storing section 2b and a second utilization license storing section 2c.

The first utilization license storing section 2b stores decoding keys used to decode data contents at every bits of content identification information.

The second utilization license storing section 2c stores certification keys of the information converting sections 1 at every bits of information converting section identification information. The certification key must be determined so that its information can be one and the same as that of a key decoding key, and thus it is predetermined that it must be stored in a encoded state so as to prevent its illegal taking-out by the user.

The utilization permission information generating section 2a, when receiving random numbers and content identification information and information converting section identification information from the information converting section 1, will retrieve a decoding key corresponding to the content identification information from the first utilization license storing section 2b, and will retrieve the certification key of the information converting section 1 from the second utilization license storing section 2c. Further, it will encode the decoding key based on the certification key and the random numbers and generate utilization permission information.

At the data content utilizing device of the present invention, when the user inputs the content identification information of data contents, the data loading section 1a of the information converting section 1 will retrieve encoded data contents and encoded content identification information corresponding to the content identification information from the data storing section 3. Then, it will report the encoded data contents and the encoded content identification information to the data decoding section 1d. At the same time, it will report information converting section identification information to the key generating section 1b. Further, it will obtain random numbers generated from the random number generating section 1e and report the random numbers, the content identification information and the information converting section identification information to the utilization permitting device 2.

Here, the converting section 11 of the key generating section 1b will load key information from the key registering section 10 and generate a key decoding key by converting the information converting section identification information with this key information. Then, it will report the generated key decoding key to the key decoding section 1c. The key decoding section 1c, in turn, will be placed on standby for utilization permission information from the utilization permitting device while the data decoding section id will be placed on standby for a decoding key from the key the key decoding section 1c.

On the other hand, the utilization information generating section 2a of the utilization permitting device 2 will retrieve the decoding key of encoded data contents corresponding to the content identification information from the first utilization license storing section 2b. Then, it will retrieve a certification key corresponding to the information converting section identification information from the second utilization license storing section 2c. Further, it will encode the decoding key by using the certification key and the random numbers and generate utilization permission information. Then, it will report the utilization permission information to the information converting section 1. The key decoding section 1c of the information converting section 1, upon receiving the utilization permission information, will decode it by the key decoding key generated by the key generating section 1b and generate a decoding key. Then, it will report the decoding key to the data decoding section 1d.

The decoding section 12 of the data decoding section 1d will decode the encoded data contents and the encoded content identification information by the decoding key decoded by the key decoding section 1c.

Then, the comparing section 13 of the data decoding section 1d will compare the content identification information decoded by the decoding section 12 and the content identification information input by the user and identify if they coincide. If they are found to be coincident, the comparing section 13 will output parts of the data contents from the reproducing device, and at the same time output a message asking the user to select either utilization or non-utilization of the data contents. If the user requests utilization of the data contents, it will output all of the data contents from the reproducing device. Or, if the user does not request utilization thereof, it will terminate outputting of the data contents.

On the other hand, in the case where both of the content identification information are found not to be coincident, or in the case where decoding of the content identification information is found not to have been carried out normally, the comparing section 13 will output a message indicating a decoding error from the reproducing device.

The data content utilizing device according to the second embodiment of the present invention will be described with reference to FIG. 2.

The data content utilizing device includes a data storing section 3, a utilization license storing section 4 and an information converting section 1.

The data storing section 3 stores encoded data contents and encoded content identification information at every sentence type content identification information.

The utilization license storing section 4 registers utilization keys for every content identification information used to identify individual data contents.

The information converting section 1 decodes data contents requested by the user and outputs them from the reproducing device to a screen or a speaker.

Each of these components will be described hereinbelow.

The information converting section 1 includes a data loading section 1a, a key generating section 1b, a key decoding section 1c and a data decoding section 1d.

The data loading section 1a retrieves encoded data contents and encoded content identification information corresponding to content identification information to be input by the user from the data storing section 3. Further, the data loading section 1a retrieves a utilization key corresponding to the content identification information from the utilization license storing section 4.

The key generating section 1b generates a key decoding key based on device identification information specific to a device utilized by the user. The key generating section 1b includes a key registering section 10 and a converting section 11.

The key registering section 10 registers specified key information while the converting section 11 converts device identification information by a key stored in the key registering section 10 and generates a key decoding key.

The key decoding section 1c decodes a utilization key loaded by the data loading section 1a by a key decoding key generated by the key generating section 1b and generates a decoding key.

The data decoding section 1d decodes encoded data contents and encoded content identification information loaded by the data loading section 1a by a decoding key generated by the key decoding section 1c. This data decoding section 1d includes a decoding section 12 for decoding encoded data contents and encoded content identification information by a decoding key generated by the key decoding section 1c and a comparing section 13 for comparing content identification information decoded by the decoding section 12 and content identification information input by the user.

At the data content utilizing device, when the user inputs the content identification information of data contents which he wants, the data loading section 1a of the information converting section 1 will retrieve encoded data contents and encoded content identification information corresponding to the content identification information from the data storing section 3. At the same time, the data loading section 1a will retrieve utilization key information corresponding to the content identification information from the utilization license storing section 4. Then, the data loading section 1a will report the encoded data contents and the encoded content identification information to the data decoding section 1d and the utilization key to the key decoding section 1c.

The converting section 11 of the key generating section 1b will load specified key information from the key registering section 10 and generate a key decoding key by converting device identification information with the key information. Then, it will report the key decoding key to the key decoding section 1c.

The key decoding section 1c will decode the utilizing key by the key decoding key generated by the key generating section 1b and generate a decoding key. Then, it will report the decoding key to the data decoding section 1d.

The decoding section 12 of the data decoding section 1d will decode the encoded data contents and the encoded content identification information by the decoding key generated by the key decoding section 1c. Here, the comparing section 13 will compare the content identification information decoded by the decoding section 12 and the content identification information input by the user. Then, if both of the content identification information coincide, it will reproduce/output the data contents from the reproducing device for a specified period of time. At the same time, it will give a message asking the user to select utilization or nonutilization of the data contents.

If the user makes a request for utilizing the data contents within a specified period of time, the comparing section 13 will let the device continue outputting them.

If the user makes no requests for utilizing the data contents, or if there is no response from the user within a specified period of time, the comparing section 13 will terminate outputting thereof after the passage of a certain period of time.

The data content utilizing device according to the third embodiment of the present invention will be described with reference to the accompanying drawing.

Figure 3:
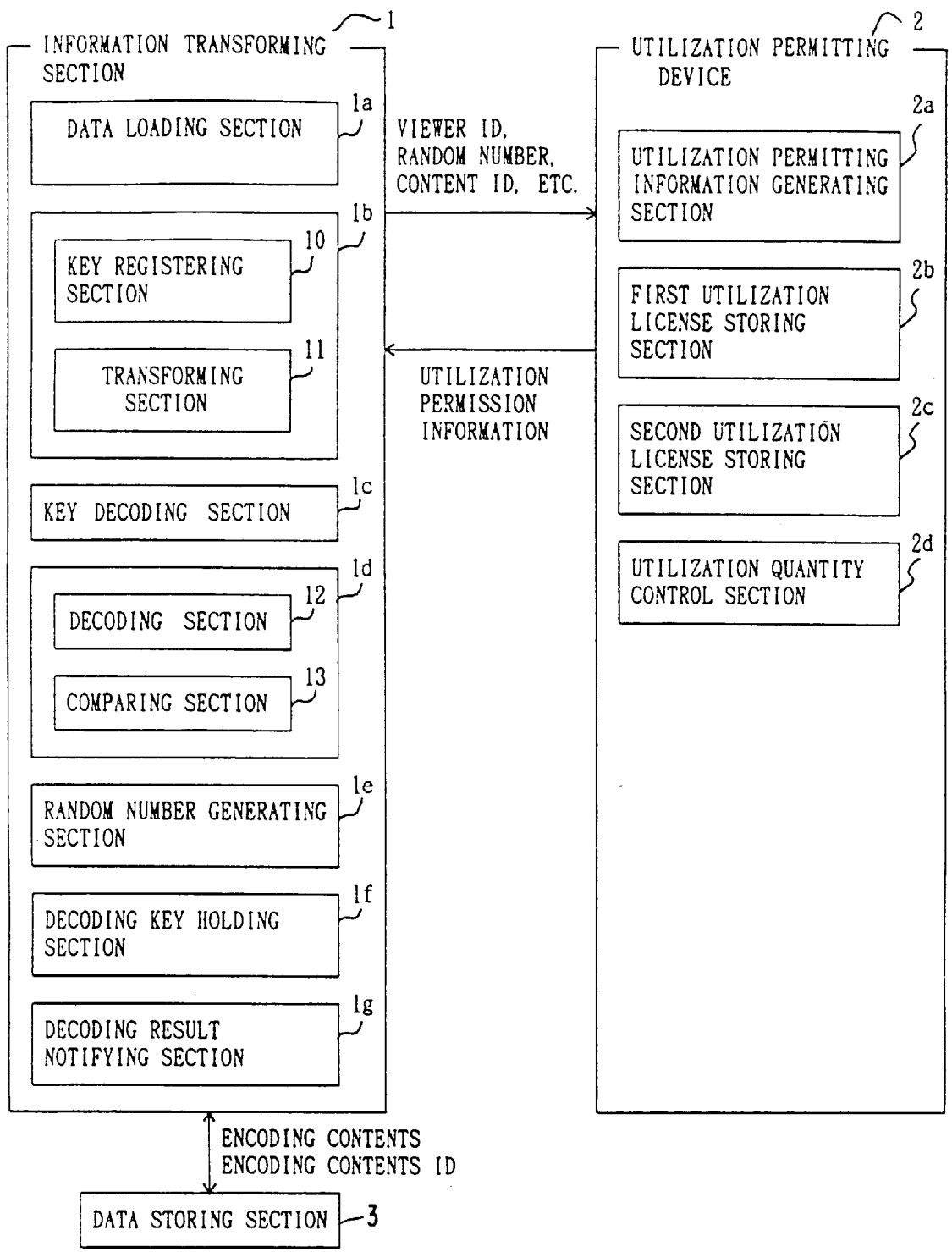
FIG. 3 is a view showing the construction of a data content utilizing device according to the embodiment 3.

FIG. 3 is a block diagram showing the construction of the data content utilizing device of the present invention.

The data content utilizing system includes a data storing section 3, an information converting section 1 and a utilization permitting device 2.

Description of the data storing section will be omitted, as it is similar to the case in the first and second embodiments of the present invention.

The information converting section 1 decodes encoded data contents and outputs them from the reproducing device to a screen or a speaker.

The utilization permitting device 2 generates utilization permission information used to give permission to utilization of data contents.

Each of these components will be described hereinbelow.

The information converting section 1 includes a data loading section 1a, a key generating section 1b, a key decoding section 1c, a data decoding section 21d, a random number generating section 1e and a decoding result reporting section 1g.

The data loading section 1a loads data contents requested by the user from the data storing section 3.

The key generating section 1b generates a key decoding key using information converting section identification information for identifying the information converting section 1 attached to each reproducing device. This key generating section 1b includes a key registering section 10 for storing specified key information and a converting section 11 for converting information converting section identification information by key information stored in this key registering section 10 and generating a key decoding key.

The key decoding section 1c decodes utilization permission information obtained from the utilization permitting device 2 by a key decoding key generated by the key generating section 1b and generates a decoding key.

The data decoding section 1d decodes encoded data contents loaded by the data loading section 1a with a decoding key. This data decoding section 1d includes a decoding section 12 for decoding encoded data contents and encoded content identification information by a decoding key generated by the key decoding section 1e and a comparing section 13 for comparing content identification information decoded by the decoding section 12 and content identification information input by the user.

The random number generating section 1e is for generating random numbers.

The decoding result reporting section 1g reports information for identifying normal decoding of data contents to the utilization permitting device 2.

The utilization permitting device 2 includes a utilization permission information generating section 2a, a first utilization license storing section 2b, a second utilization license storing section 2c and a utilization amount managing section 2d.

The first utilization license storing section 2b stores decoding keys used to decode respective data contents at every bits of content identification information and the charging information of data contents.

The second utilization license storing section 2c registers certification keys used to certify correct information converting sections at every bits of information converting section identification information. A certification key must be determined so that its information can be one and the same as that of a key decoding key.

The utilization permission information generating section 2a receives information converting identification information, content identification information and random numbers from the information converting section 1 and generates utilization permission information using these bits of information. Specifically, it retrieves a decoding key corresponding to content identification information from the first utilization license storing section 2b. It also retrieves a certification key corresponding to information converting section identification information from the second utilization license storing section 2c. Then, it generates utilization permission information by encoding a decoding key with the certification key and the random numbers.

The utilization amount managing section 2d renews the charging information of data contents if it finds that decoding has been carried out normally when it receives a decoding result from the information converting section 1. Specifically, it identifies normal decoding of data contents when it receives a decoding result from the decoding result reporting section 1g of the information converting section 1 and renews the charging information of the first utilization license storing section 2b if decoding has been normally carried out. Further, it reports information indicating if the charging information has been normally renewed to the information converting section 1.

At the data content utilizing device, when the user inputs the content identification information of data contents which he wants, the data loading section 1a of the information converting section 1 will retrieve encoded data contents and encoded content identification information corresponding to the content identification information from the data storing section 3. Then, the data loading section 1a will obtain random numbers from the random number generating section 2e. And the data loading section 1a sends the random numbers and the content identification information and information converting section identification information to the utilization permitting device 2. At the same time, the data loading section 1a will report the information converting identification information to the key generating section 1b, and will report the encoded data contents and the encoded content identification information to the data decoding section 1d.

Here, the converting section 11 of the key generating section 1b will load specified key information from the key registering section 10, and will convert the information converting section identification information by this key information, and will generate a key decoding key.

On the other hand, the utilization permission information generating section 2a of the utilization permitting device 2, when receiving the random numbers, the content identification information and the information converting section identification information from the information converting section 1, will retrieve a decoding key corresponding to the content identification information from the first utilization license storing section 2b. Further, it will retrieve a certification key corresponding to the information converting identification information from the second utilization license storing section 2c. Then, it will encode the decoding key by the certification key and the random numbers, generate utilization permission information and report it to the information converting section 1.

At this time, the key decoding section 1c of the information converting section 1 will decode the utilization permission information by the key decoding key generated by the key generating section 1b, generate a decoding key and report it to the data decoding section 1d.

The decoding section 12 of the data decoding section 1d will decode the encoded data contents and the encoded content identification information loaded by the data loading section 1a by the decoding key and report the decoded content identification information to the comparing section 13.

The comparing section 13 will compare the content identification information decoded by the decoding section 12 and the content identification information inputted by the user to see if they coincide and report its result to the decoding result reporting section 1g.

The decoding result reporting section 1g will send the decoding result received from the comparing section 13 to the utilization permitting device 2.

The utilization amount managing section 2d of the utilization permitting device 2 will consult the decoding result received from the information converting section 1 and renew the charging information of the data contents stored in the first utilization license storing section 2b if the decoding has been normally finished. On the other hand, if the decoding has not been normally finished, it will not renew the charging information of the data contents stored in the first utilization license storing section 2b. Further, it will send a charging result indicating whether the charging information has been normally renewed or not to the information converting section 1.

The information converting section 1 will identify whether the charging has been correctly operated or not by consulting the charging result received from the utilization permitting device 2, and at the same time identify whether the decoding has been normally finished or not consulting the decoding result of the comparing section 13.

Here, if it finds that the charging has been correctly operated and the decoding has been normally finished, the information converting section 1 will output the decoded data contents from the reproducing device.

On the other hand, if at least either the charging or the decoding has not been normally operated, the information converting section 1 will output a message indicating an error from the reproducing device.

Further, when outputting the data contents, the comparing section 13 may be made to output parts of the data contents decoded by the decoding section 12, and at the same time to output a message asking the user to select either utilization or nonutilization of the data contents. Accordingly, the decoding result reporting section 1g will be made to send the decoding result and information indicating if the user requests to utilize the data contents to the utilization permitting device 2. Then, based on the decoding result and the information indicating if the user requests to utilize the data contents, the utilization amount managing section 2d will identify whether the data contents have been correctly decoded or not, and at the same time identify whether the user requests for utilization. Here, only if the data contents have been correctly decoded and the user requests to utilize them, the utilization amount managing section 2d will renew the charging information of the first utilization license storing section 2b.

Figure 4:
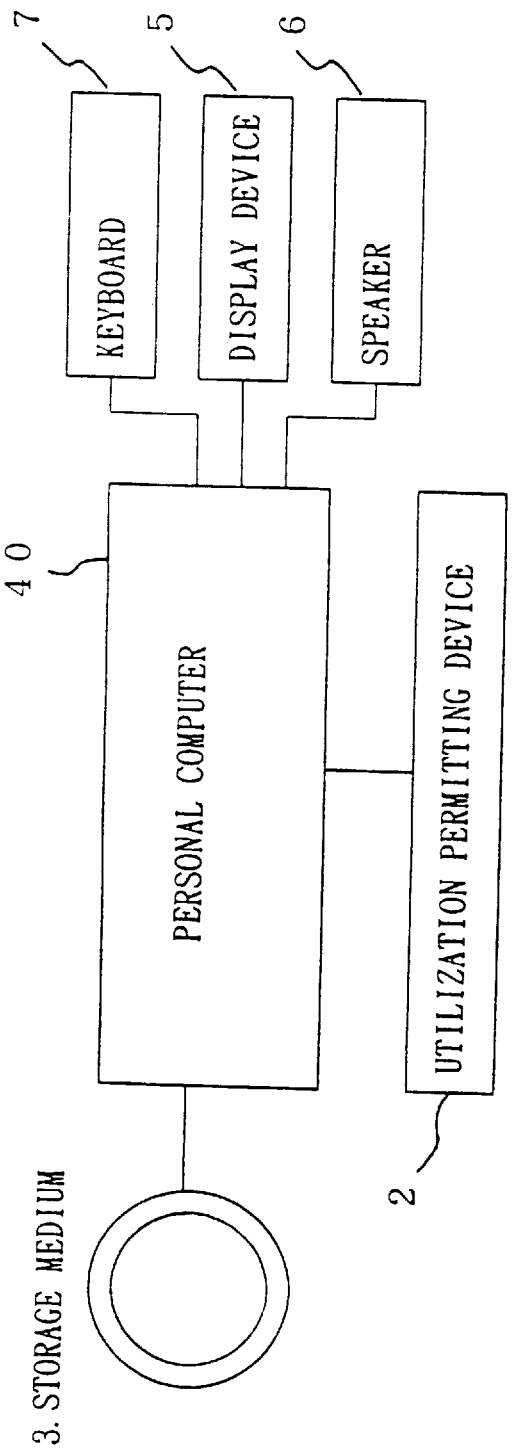
FIG. 4 is a view showing the hardware construction of a personal computer according to the embodiment 4.

The hardware construction of a personal computer to which the data content utilizing system is applied according to a fourth embodiment of the present invention is shown in FIG. 4.

Description of the a fourth embodiment will be made taking a storage medium of a CD-ROM or the like as an example of a data storing section for storing data contents. This CD-ROM stores information including data contents and the content ID thereof in encoded states. At least one or more of these bits of encoded information are stored, and each information is stored at every bits of sentence type content identification information.

Further, it is possible to provide data contents via communication lines by letting a distributor keep the data contents and by connecting this distributor and personal computers of respective users by communication lines.

The data content utilization control system is constructed by connecting the utilization permitting device 2 to a personal computer 40 having a driver device for loading data from a storage medium 3. When the user buys data contents, key information for decoding the data contents will be registered by the utilization permitting device 2. This key information must be registered in a encoded state so as to assure security.

The utilization permitting device 2 registers decoding key information encoded by the distributor of data contents while to the personal computer 40 a keyboard 7 for inputting the content ID of data contents which the user requests, a display device 5 for outputting image data and a speaker 6 for outputting audio data are connected.

The functions of the personal computer 40 and the utilization permitting device 5 according to the fourth embodiment will be described hereinbelow.

Figure 5:
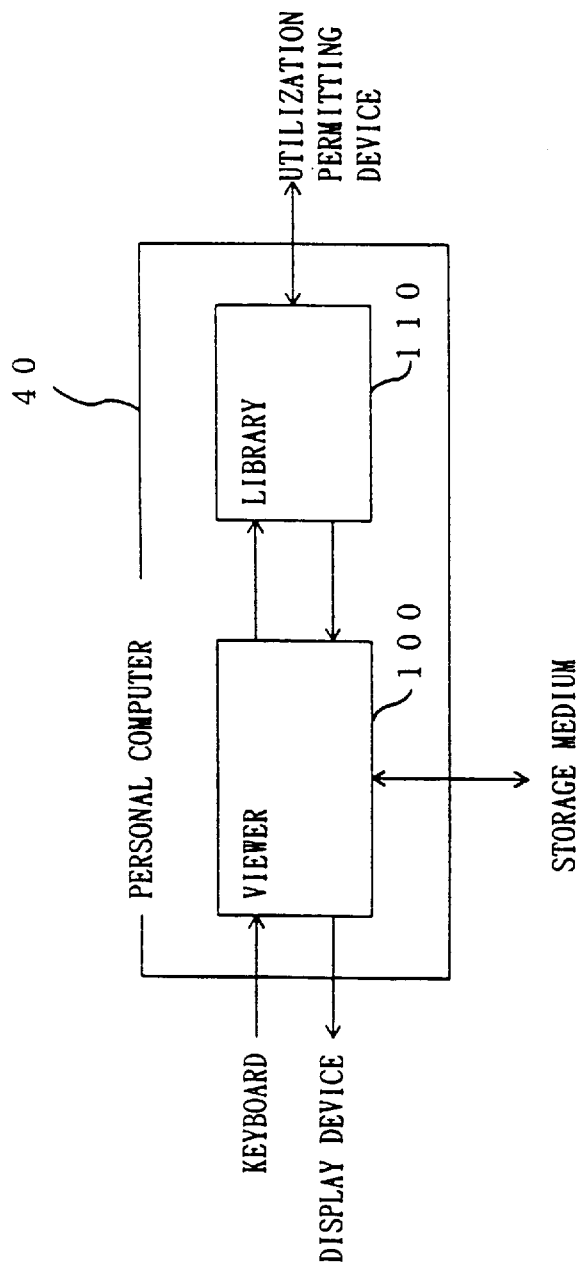
FIG. 5 is a block diagram showing the functional construction of a personal computer according to the embodiment 4.

FIG. 5 is a block diagram showing the functional construction of the personal computer 40.

This function will be made to work when a CPU executes control programs stored in a memory.

According to the fourth embodiment of the present invention, the personal computer 40 includes a viewer 100 and a library 110.

The viewer 100 is provided with a function for outputting optional data contents as visible and audible information to the display device 5 or the speaker 6.

The library 110 is provided with a function for decoding data contents which have been encoded(hereinafter called encoded data contents) when receiving permission from the utilization permitting device 2.

Figure 6:
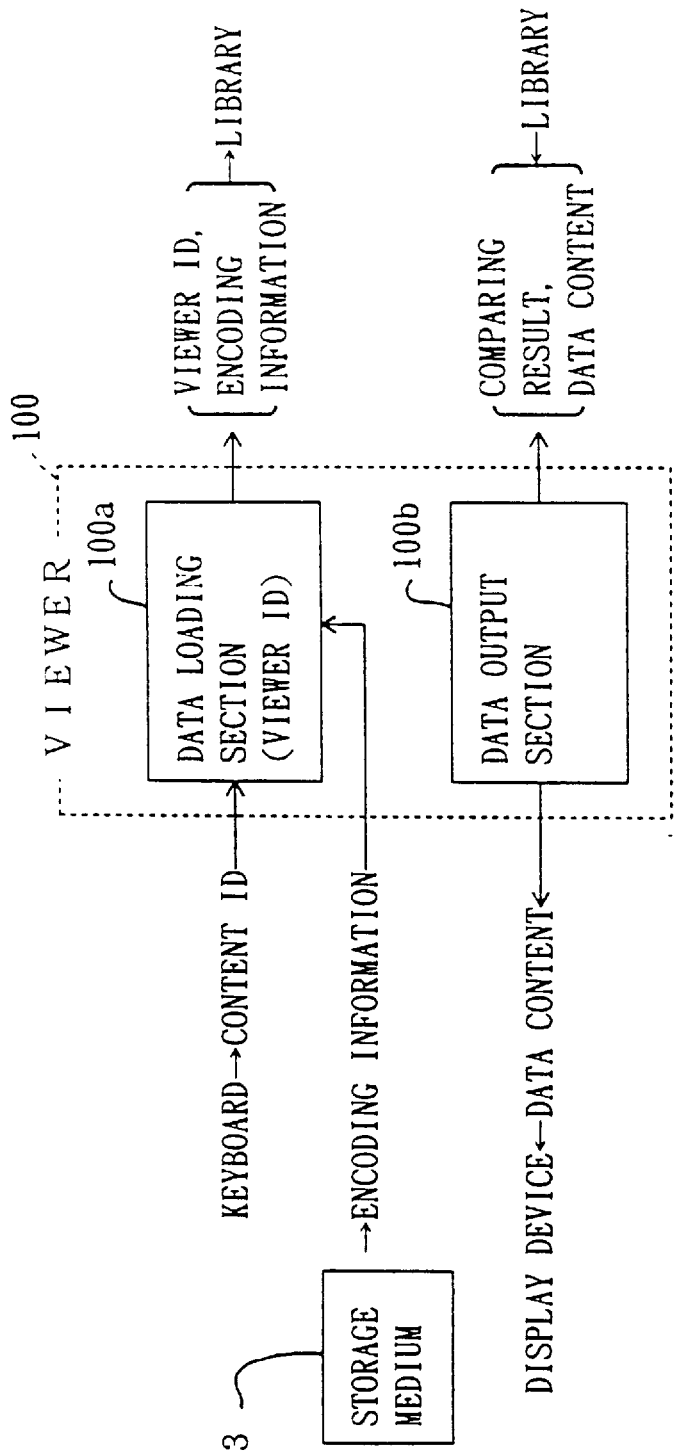
FIG. 6 is a block diagram showing the functional construction of a viewer according to the embodiment 4.

The functional construction of the viewer 100 is shown in FIG. 6. This viewer 100 is a module having no routine for filing data including a data loading section 100a and a data outputting section 100b.

The data loading section 100a, when a content ID is input from the keyboard 7, will access the storage medium 3 based on this content ID for loading encoded data contents and a content ID which has been encoded(hereinafter called encoded content ID). Further, this section 100a is provided with a function for reporting a viewer ID specifying its own viewer to the library 110 in addition to the content ID, the encoded data contents and the encoded content ID.

On the other hand, the data outputting section 100b is provided with a function for outputting data contents decoded at the library 110 from the display device 5 or the speaker 6. Specifically, it outputs only data contents decoded normally at the library 110.

Figure 7:
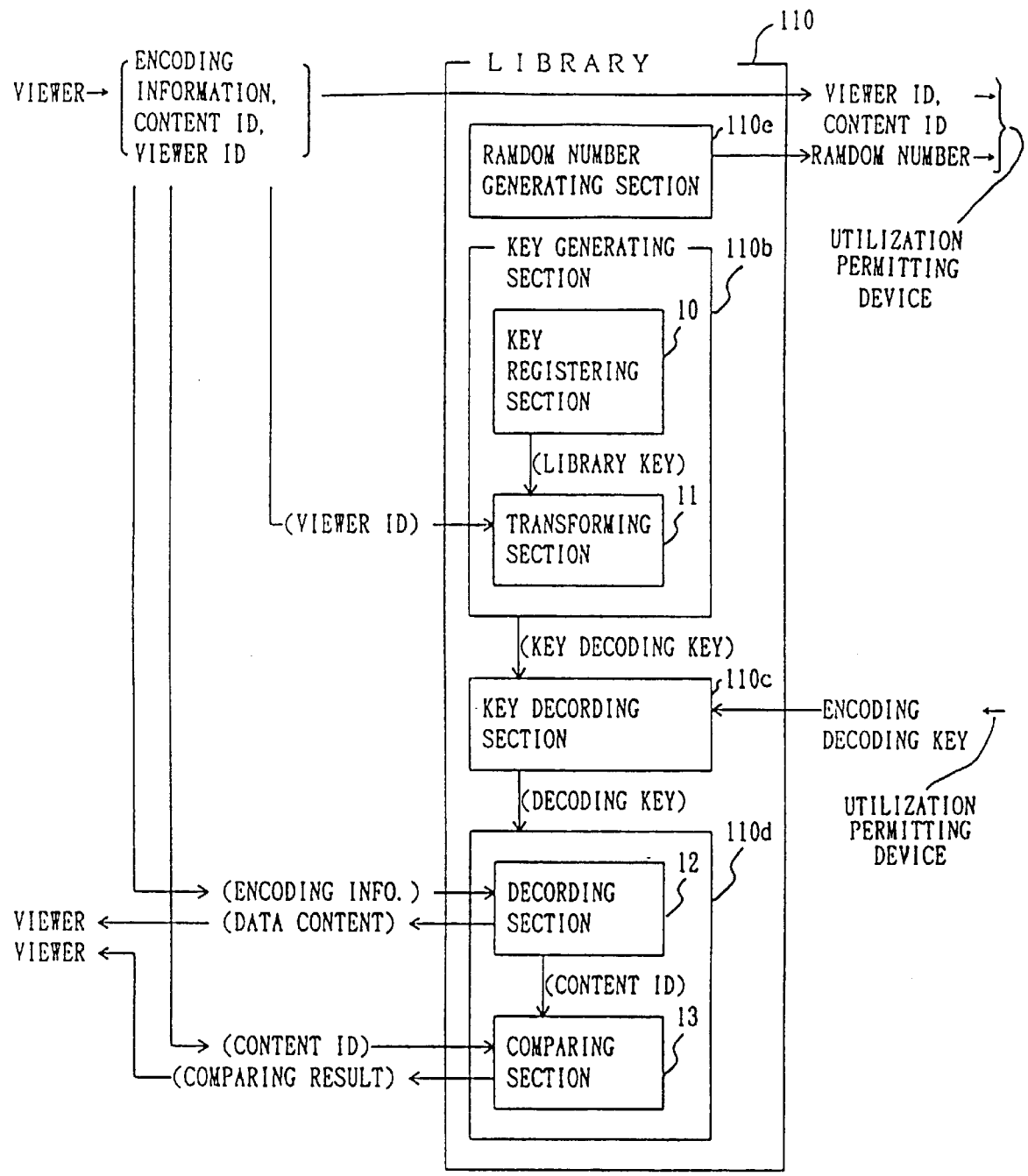
FIG. 7 is a block diagram showing the functional construction of a library according to the embodiment 4.

The function of the library 110 will be described with reference to FIG. 7.

The library 110 includes a key generating section 110b, a key decoding section 100c, a data decoding section 110d and a random number generating section 110e.

The key generating section 100b includes a key registering section 10 for registering a library key indicating its own library and a converting section 11 for converting a viewer ID received from the viewer 100 by a library key stored in the key registering section 10 and generating a key decoding key.

The key decoding section 100c is provided with a function for decoding an encoded decoding key as utilization permission information received from the utilization permitting device 2 by a key decoding key generated by the key generating section 100b.

The data decoding section 100d is provided with a function for decoding encoded data contents and a encoded content ID received from the viewer 100 by a decoding key decoded by the key decoding section 110c. Specifically, it includes a decoding section 12 for decoding encoded data contents and a encoded content ID by a decoding key. Further, it includes a comparing section 13 for comparing a content ID decoded by the decoding section 12 and a content ID input by the user to identify normal decoding and reporting its identification result to the viewer 100.

The data outputting section 100b of the viewer 100 determines whether or not to output data contents decoded by the decoding section 12 based on the identification result of the comparing section 13. That is, the data outputting section 100 will output data contents only when a decoding operation has been correctly carried out. On the other hand, if the decoding of data contents has not been carried out correctly, the comparing section 13 will output a message indicating a decoding error from the viewer 100.

Figure 8:
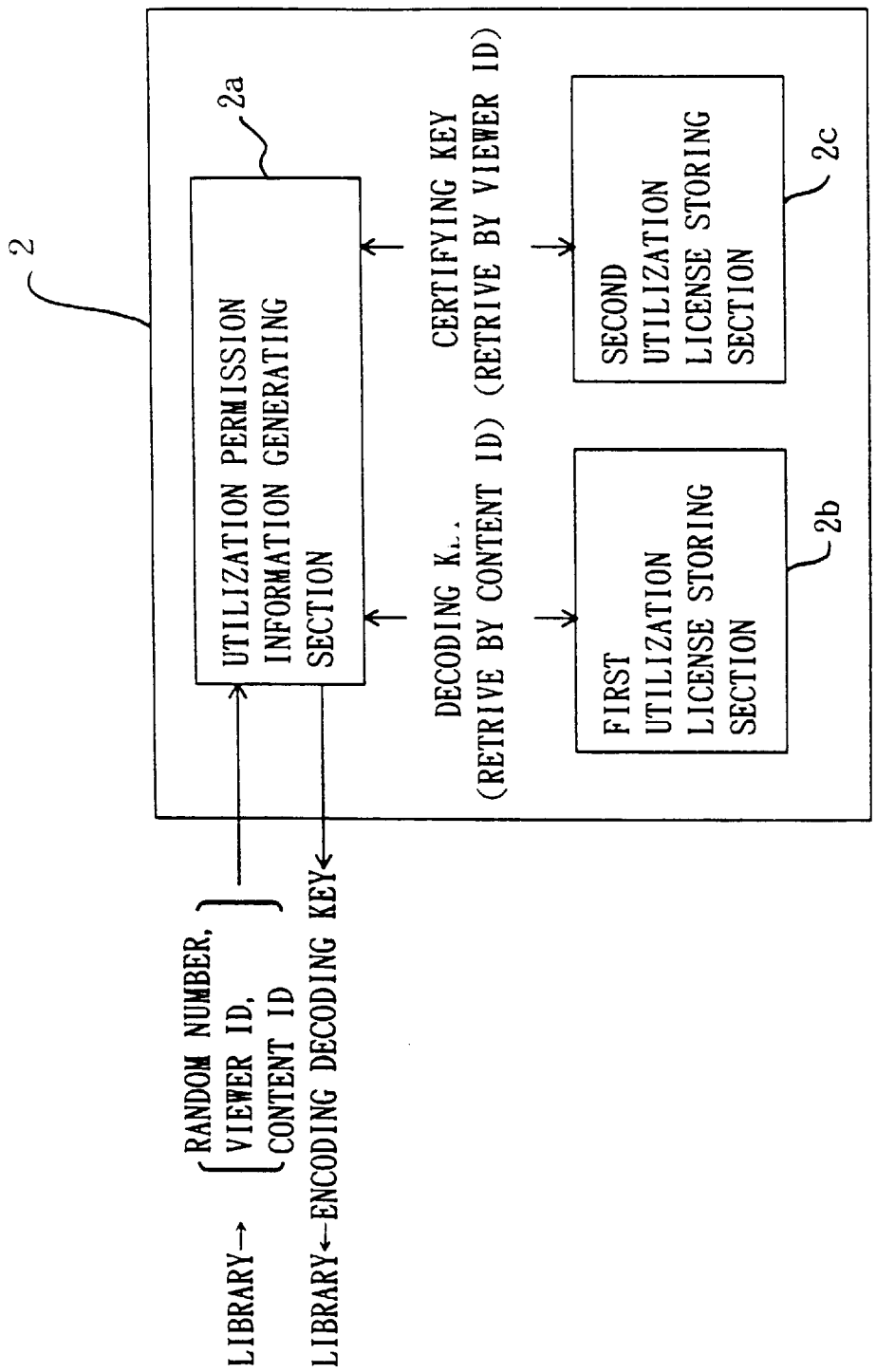
FIG. 8 is a block diagram showing the functional construction of a utilization permitting device according to the embodiment 4.

FIG. 8 is a block diagram showing the functional construction of the utilization permitting device 2 according to the fourth embodiment of the present invention.

As shown in FIG. 8, the function of the utilization permitting device 2 is made to work when its processor executes control programs stored in a memory.

The utilization permitting device 2 includes a utilization permission information generating section 2a, a first utilization license storing section 2b and a second utilization license storing section 2c.

The first utilization license storing section 2b is for registering decoding keys used to decode respective encoded data contents at every content IDs.

The second utilization license storing section 2c is for registering certification keys for respective viewers at a each content IDs. This certification key is information to be determined so that it can be the same as that of a key decoding key.

The utilization permission information generating section 2a is provided with a function for generating decoding key information as utilization permission information. Specifically, it is provided with a function for retrieving the decoding key of data contents from the first utilization license storing section 2b based on a content ID received from the library 110, the one for retrieving the certification key of a viewer from the second utilization license storing section 2c based on a viewer ID received from the library 110 and the one for encoding decoding key information by certification key information.

The operations of the fourth personal computer 40 and the utilization permitting device 2 according to the embodiment will be described hereinbelow.

Figure 9:
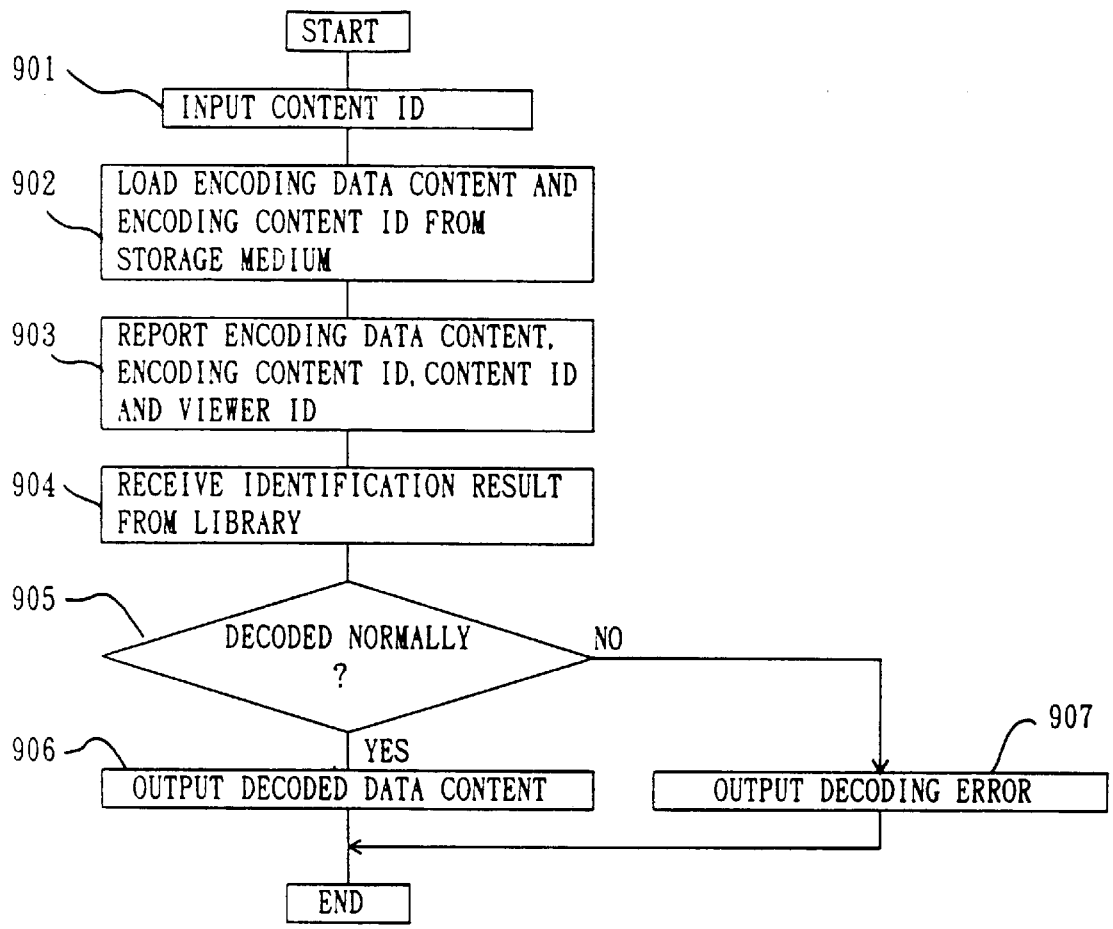
FIG. 9 is a flow chart showing the operation of a viewer according to the embodiment 4.

First, the operation of the viewer 100 will be described with reference to FIG. 9.

When the user inputs the content ID of data contents which he requests from the keyboard 7 of the personal computer 40(step 901), the data loading section 100a of the viewer 100 will access the storage medium 3 based on this content ID for loading encoded data contents and an encoded content ID(step 902).

Then, the data loading section 100a will report the encoded data contents, the encoded content ID, the content ID input by the user and a viewer ID to the library 110(step 903).

At this time, decoding of the encoded data contents and the encoded content ID will be operated at the library 110. Further, the library 110 will compare the decoded content ID and the content ID input by the user and report information indicating whether they coincide or not to the viewer 100. The viewer 100, upon receiving the comparing result(step 904), will recognize whether the decoding has been normally finished or not based on this comparing result(step 905).

Here, if it is found that the decoding has been normally finished, the data outputting section 100b will output the data contents decoded by the decoding section 12 from the display device 5 or the speaker 6(step 906).

At the step 905, if it is found that the decoding has not been correctly finished, the data outputting section 100b will output a message indicating a decoding error from the display device 5 or the speaker 6(step 907).

Figure 10:
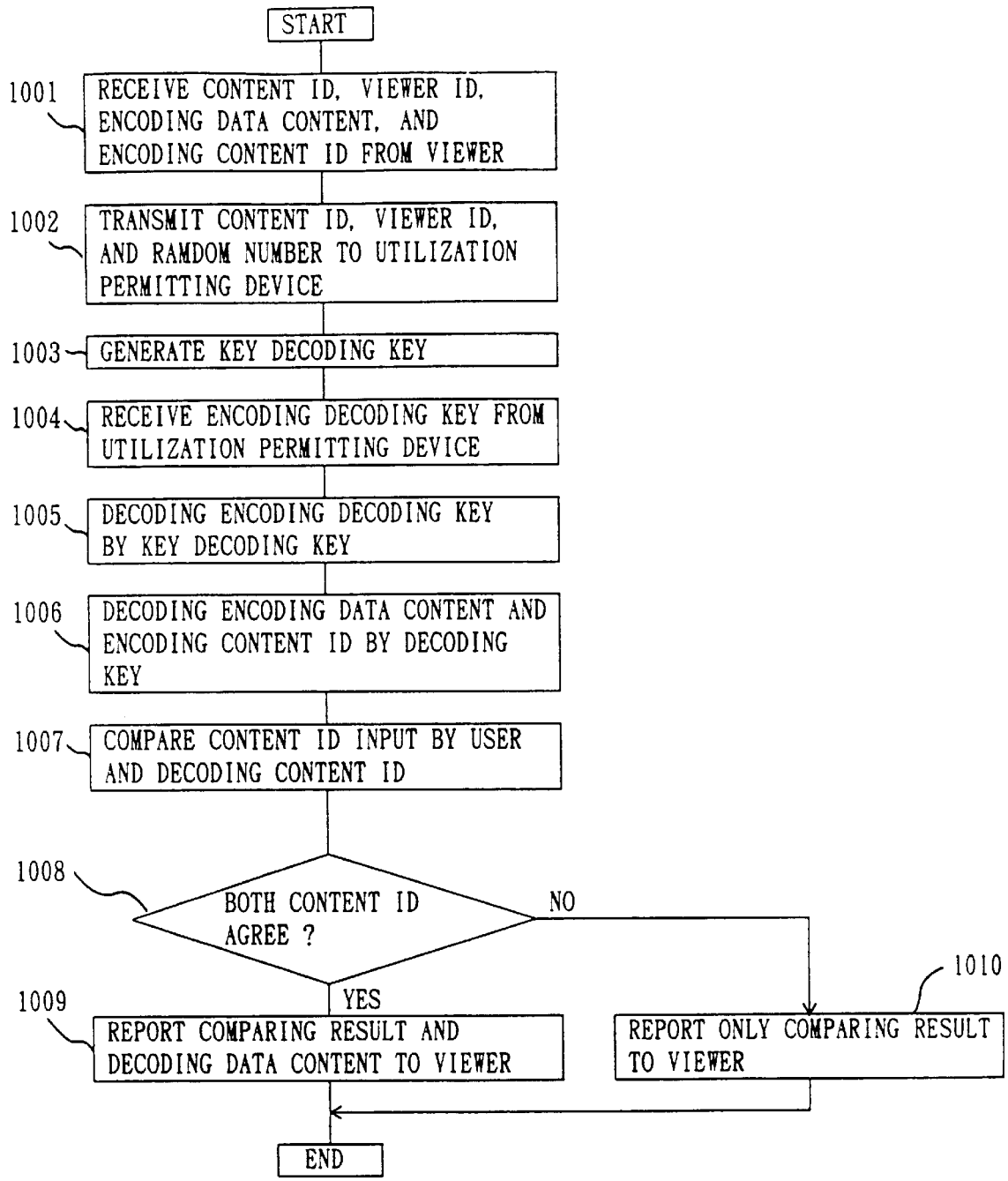
FIG. 10 is a flow chart showing the operation of a library according to the embodiment 4.

The operation of the library will be described with reference to FIG. 10 hereinbelow.

When it receives the viewer ID, the encoded data contents, the encoded content ID and the content ID input by the user(step 1001), the library 110 will send the content ID, the viewer ID and the random numbers generated by the random number generating section 110e to the utilization permitting device(1002). Further, it will report the viewer ID to the key generating section 100b and the encoded data contents and the encoded content ID to the data decoding section 110d.

Then, the converting section 11 of the key generating section 110 will convert the viewer ID by a library key stored in the key registering section 10 and generate key decoding key information(step 1003).

When receiving the encoded decoding key information from the utilization permitting device 2(step 1004), the key decoding section 110c will decode this encoded decoding key by a key decoding key(step 1005).

The decoding section 12 of the data decoding section 110b will decode the encoded data contents and the encoded content ID by a decoding key(step 1006). Here, the comparing section 13 will compare the content ID decoded by the decoding section 12 and the content ID input by the user(step 1007) and identify if they coincide(step 1008).

If they are found to be coincident, that is, the decoding has been correctly carried out, the comparing section 13 will report it and the decoded data contents to the viewer 100(step 1009).

At step 1008, if both content IDs are found not to be coincident, that is, the decoding has not been correctly carried out, the comparing section 13 will report only its comparing result to the viewer 100(step 1010).

Figure 11:
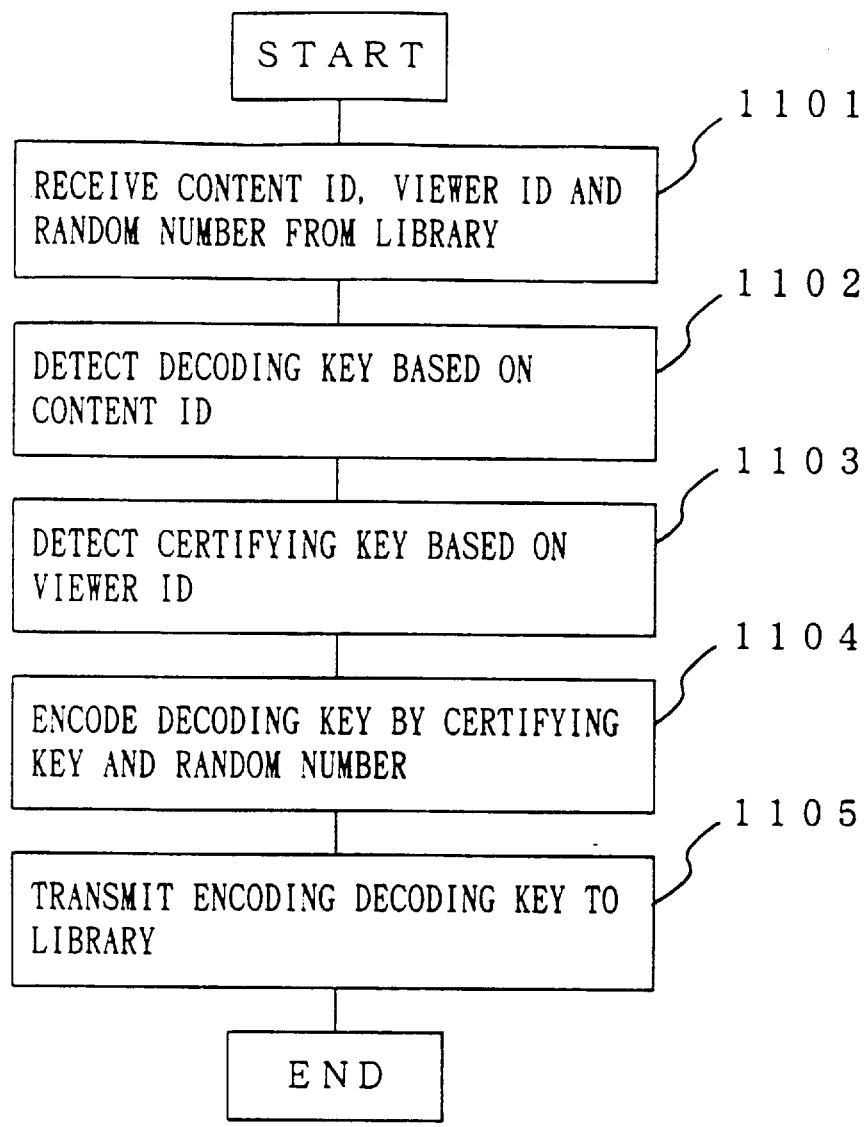
FIG. 11 is a flow chart showing the operation of a utilization permitting device according to the embodiment 4.

The operation of the utilization permitting device 2 will be described with reference to a flow chart in FIG. 11 hereinbelow.

The utilization permission information generating section 2a of the utilization permitting device 2, when receiving the content ID and the viewer ID and the random numbers from the library 110(step 1101), will retrieve the decoding key information of the data contents from the first utilization license storing section 2b based on the content ID(step 1102).

Further, the utilization permission information generating section 2a will retrieve the certification key information of the viewer 100 from the second utilization license storing section 2c based on the viewer ID(step 1103). Here, it will encode the decoding key information based on the certification key information based on the certification key information and the random numbers(step 1104), and send this encoded decoding key information to the library 110(step 1105).

According to the fourth embodiment of the present invention, it will be possible to prevent filing of data by providing a viewer specialized for outputting data contents.

Further, by encoding decoding key information with certification keys for every viewers and random numbers generated at a library, it will be possible to prevent decoding deeds by users and illegal utilization of data contents.

The hardware construction of a software reproducing device 14 to which a data content utilizing system according to the fifth embodiment of the present invention will be described with reference to FIG. 12.

In the fifth embodiment of the present invention, a form of distributing data contents stored in a CD-ROM is shown.

Figure 12:
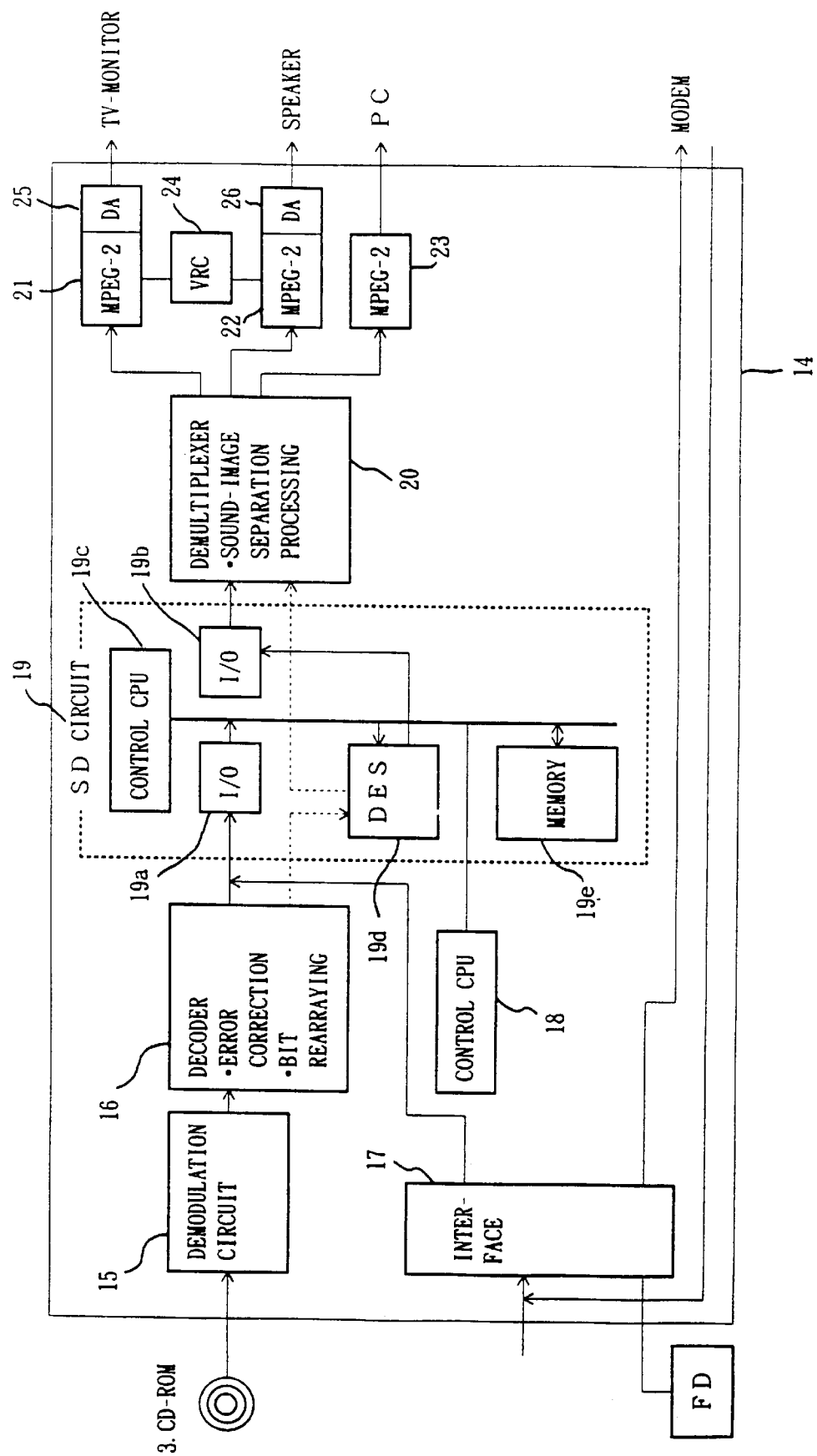
FIG. 12 is a view showing the hardware construction of a software reproducing device to which a data content utilization control system is applied according to the embodiment 5.

The software reproducing device shown in this FIG. 12 is the one for reproducing/outputting data contents stored in a CD-ROM.

Further, though encoded data contents are provided stored in a CD-ROM for the purpose of explanation of the present embodiment, they can also be obtained as information via communications.

This software reproducing device 14 is information equipment capable of uniformly treating various data contents provided on a common data format. Specifically, it is provided with a function for loading these various kinds of data contents, executing computer programs, reproducing movie and television programs(reproduction of image and audio signals), reproducing music data(reproduction of audio signals), displaying static images, etc. As for movie and television programs, image and audio signals are linked together to be synchronously output. At this software reproducing device 14, loading to a CD-ROM is executed by a driving device(not shown in FIG. 12). Data frames loaded by this driving device are input to a demodulation circuit/control circuit 15. This demodulation circuit/control circuit 15 is provided with a function for demodulating of the input data frames the image and audio information of MPEG standard and transmitting it to a decoder 16.

The decoder 16 is provided with a function for executing error correction and bit rearraying and transferring image and audio information of up to 2 MB/sec. (1 MB/sec. on the average) to an SD circuit 19. This decoder 16 is connected to a system bus B within the SD circuit 19 via an I/O(input/output) device 19a so as to transfer this image and audio information.

To the system bus B within the SD circuit 19 an interface 17 is connected as well via the I/O device 19a. This interface 17 is used for input/output processing among an operation key, a floppy disk drive, and a modem not shown in the FIG. 12) set outside the software reproducing device 14 and the SD circuit 19. Data contents transmitted via communication networks are input to the SD circuit 19 through the modem and the interface 17. The data contents supplied this way have forms similar to those supplied in CD-ROMs and encoded beforehand(and compressed).

The function of the SD circuit 19 connected to the decoder 15f and the interface 17 will be described hereinbelow.

As various data contents provided to the software reproducing device 14 are distributed in an easily obtainable form as in the case of CD-ROMs and communications, how to give utilization permission is a difficult problem. The SD circuit 19 is prepared for this object. That is, various data contents reproducible by this software reproducing device 14 are distributed in a encoded state. These encoded data contents are sequentially decoded by the SD circuit 19.

This SD circuit 19 is realized in the form of an IC card freely attachably/detachably inserted into the card slot(e.g., PCMCIA standard card slot) of the software reproducing device 14.

Further, the SD circuit 19 is constructed by a control CPU 19c, a DES(Data Encryption Standard) 19d, a memory 19e and I/O devices 19a and 19b which are all connected to the bus B.

The control CPU 19c controls sending/receiving of information among the decoder 15, a demultiplexer 20 and the DES 19d together with a host control CPU 18 within the software reproducing device 14. It is also provided with a function for controlling the DES 19d.

The memory 19e stores the control programs of the control CPU 19c.

The DES 19d is provided with a function for decoding image and audio information received from the decoder 16 and the one for encoding user information generated by utilizing data contents. This user information is reported to those who have licenses to data contents via communication networks or written in a floppy disk FD and recovered by them.

Data frames(image data, audio data and so on) decoded by the DES 19d are sent to the demultiplexer 20 outside the SD circuit 19 through the I/O device 19b. The demultiplexer 20 separates audio data frames, image data frames, computer programs and their data. Then, the image data frames are output to an MPEG expansion circuit(MPEG-2) 21, the audio data frames to an MPEG expansion circuit(MPEG-2) 22 and the computer programs and their data to an MPEG expansion circuit(MPEG-2) 23.

The MPEG expansion circuits(MPEG-2) 21, 22 and 23 are the ones for expanding the image data frames or the audio data frames transmitted in compressed states based on the MPEG standard and restoring them to a format allowing output. When the data frames are expanded at these circuits 21, 22 or 23, outputs will get synchronized by a VRC circuit 24. That is, synchronizing with a synchronous signal output from the VRC circuit 24, the MPEG circuits 21, 22 and 23 output the expanded data frames. For the MPEG expansion circuit, an IC chip "ISO/IEC CD 13818'1 to 3" can be used.

Outputs from the MPEG expansion circuit(MPEG-2) 21 for images are converted into analog signals by a D/A converter(DA) 25. These analog signals are output toward a TV monitor(not shown in FIG. 12) connected to the software reproducing device 14. Outputs from the MPEG expansion circuit(MPEG-2) 22 for audio are converted into analog signals by a D/A converter(DA) 26. These analog signals are output toward a speaker(not shown in FIG. 12) connected to the software reproducing device 14. On the other hand, programs or data for computers are output toward a computer(not shown in FIG. 12) connected to the software reproducing device 14 passing through the MPEG expansion circuit(MPEG-2) 23.

The function and construction for realizing the data content utilizing system according to the present invention will be described hereinbelow.

The data content utilizing system according to the present invention is made to function when the control CPU 18 of the software reproducing device 14 executes control programs stored in the memory(not shown in FIG. 12).

Figure 13:
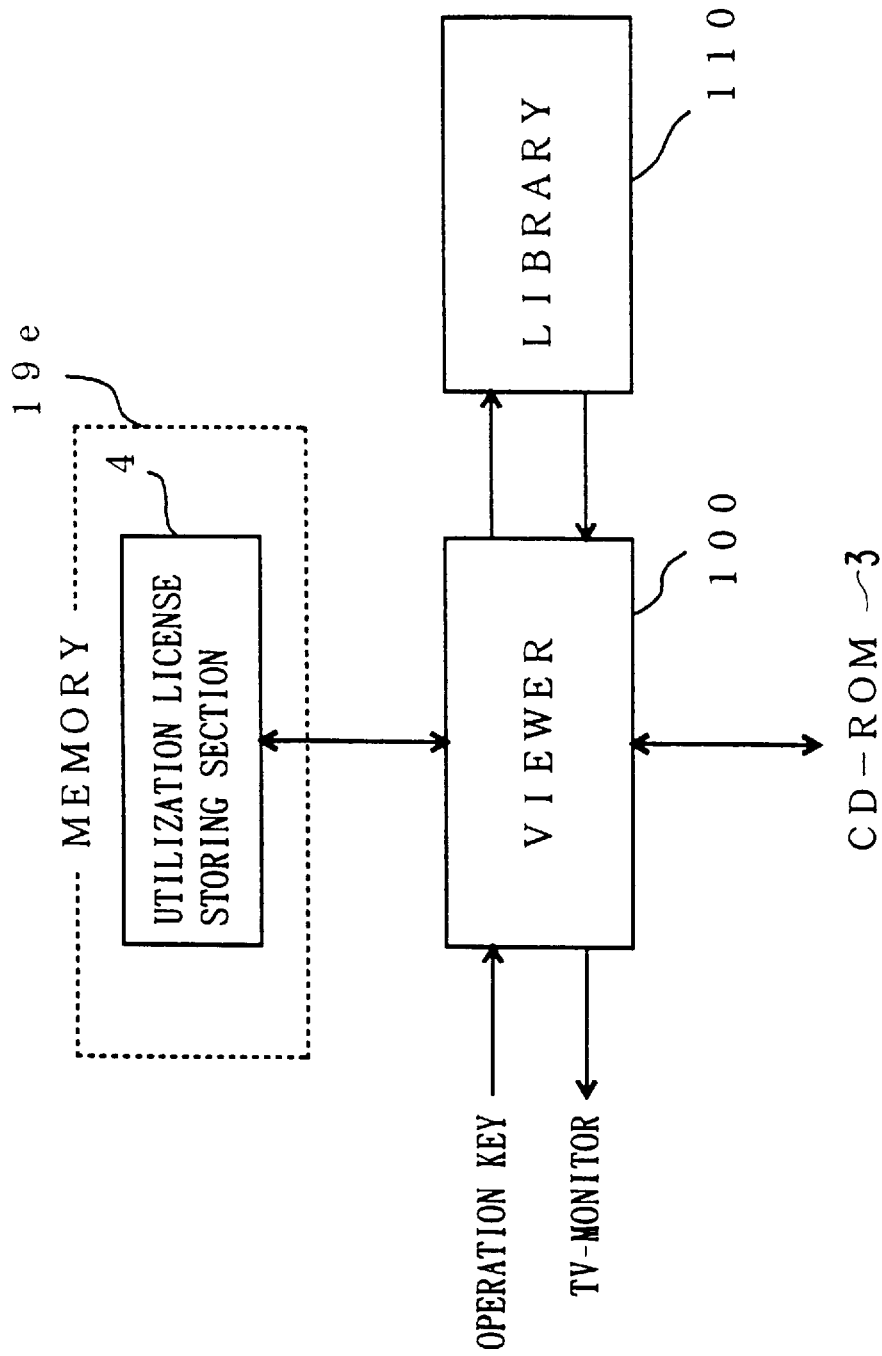
FIG. 13 is a block diagram showing the functional construction of a data content utilization control system according to the embodiment 5.

The functional construction of the data content utilization control system according to the embodiment of the present invention is shown in FIG. 13.

As shown in this Figure, the data content utilization control system includes a viewer 100, a library 110, a utilization license storing section 4 and a CD-ROM 3 as a data storing section.

The CD-ROM 3 as in the fourth case of the embodiment of the present invention stores encoded information including data contents and content IDs and this information is registered at every sentence type content IDs.

The utilization license storing section 4 is provided on a memory 19e storing utilization key information of respective data contents at every content IDs. Then, when buying data contents, the user will bring the SD circuit 19 with him so that the decoding information of data contents can be written in its utilization license storing section 4. This decoding information is written in a encoded state in order to assure security.

The viewer 100 is provided with a function for outputting data contents which the user requests as visible and audible information from a TV monitor, a speaker or a personal computer PC.

The library 110 is provided with a function for decoding encoded data contents.

The functions of the viewer 100 and the library 110 will be described in detail hereinbelow.

The functional construction of the viewer 100 according to the fifth embodiment of the present invention is similar to the case in the fourth embodiment having a data loading section 100a and a data outputting section 100b.

The data loading section 100a is provided with a function for receiving a content ID input by the user from an operation key via an interface 17, an I/O device 19a and a bus B and based on this content ID loading encoded data contents and a encoded content ID stored in a CD-ROM via a demodulation circuit/control circuit 15, a decoder 16, the I/O device 19a and the system bus B.

Further, the data loading section 100a according to the fifth embodiment is provided with a function for retrieving the utilization key information of data contents from the utilization license storing section 4 based on the content ID. This utilization key information is the one made by encoding decoding key information for decoding encoded data contents.

The data outputting section 100b is provided with a function for outputting data contents decoded at the library 110 as visible and audible data from a TV monitor, a speaker or a personal computer PC via an I/O 19b, a demultiplexer 20, MPEG expansion circuits(MPEG-2) 21, 22 and 23 and D/A converters(DA) 25 and 26.

Figure 14:
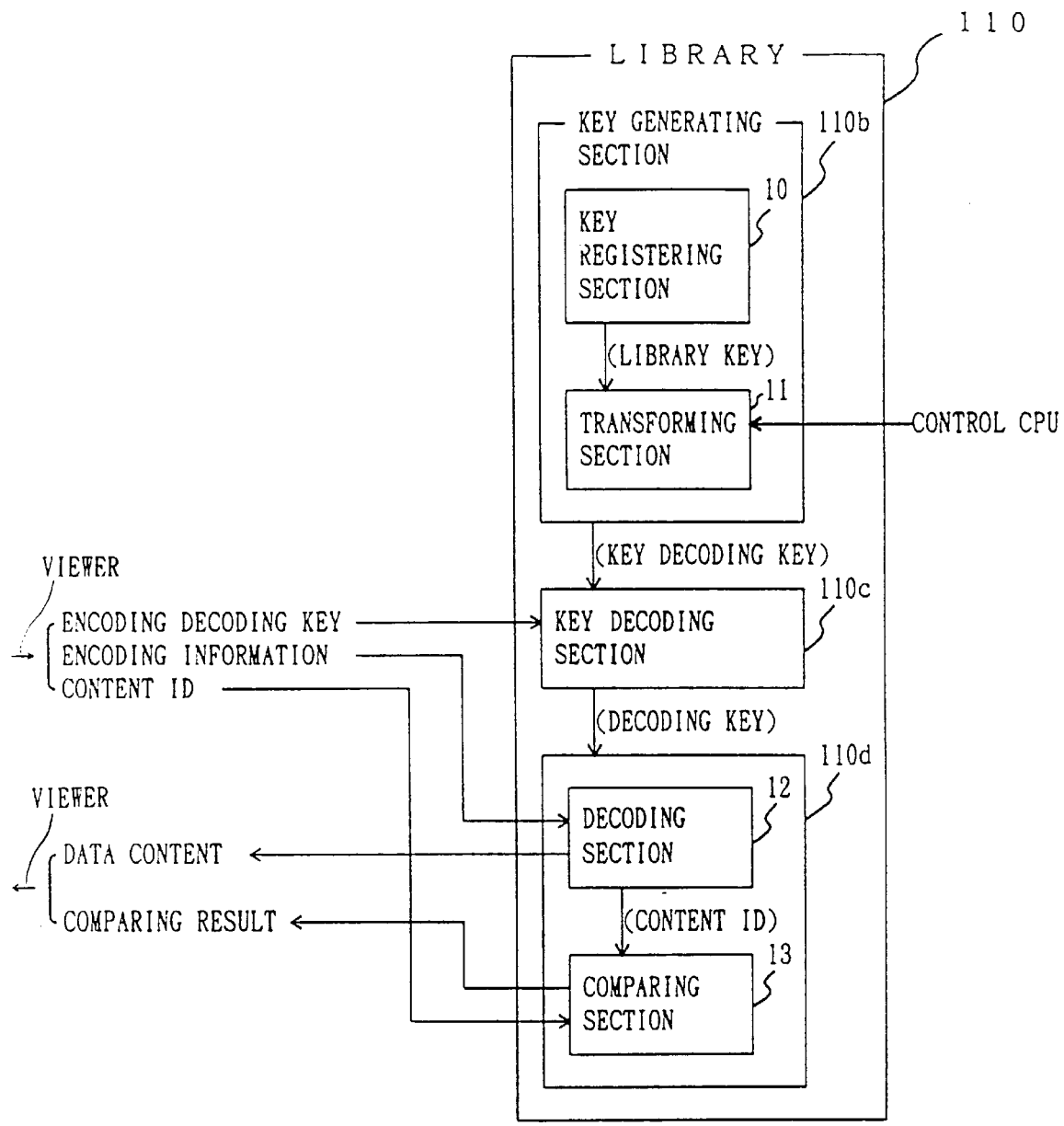
FIG. 14 is a block diagram showing the functional construction of a library according to the embodiment 5.

The functional construction of the library 110 according to the fifth embodiment is shown in FIG. 14.

As shown in this Figure, the library 110 according to the fifth embodiment includes a key generating section 110b, a key decoding section 110c and a data decoding section 110d.

The key generating section 110b includes a key registering section 10 for holding a library key specific to its own library 110 and a converting section 11 for generating a key decoding key by converting a CPU-ID specifying a control CPU 18 with the library key of the key registering section 10.

The key decoding section 110c is provided with a function for decoding utilization key information loaded by the viewer 100 by key decoding key and generating a decoding key.

The data decoding section 110d is provided with a function for decoding encoded data contents loaded by the viewer 100 by a decoding key decoded by the key decoding section 110c. Specifically, it includes a decoding section 12 and a comparing section 13. The decoding section 12 is provided with a function for decoding encoded data contents and a encoded content ID loaded by the viewer 100 by a decoding key generated by the key decoding section 110c. On the other hand, the comparing section 13 is provided with a function for comparing a content ID decoded by the decoding section 12 and a content ID input by the user and identifying whether they coincide or not, that is, whether decoding has been correctly finished or not. Further, it is provided with a function for giving permission to outputting of decoded data contents to the viewer 100.

The operation of the data content utilization control system according to the embodiment 5 will be described hereinbelow.

Figure 15:
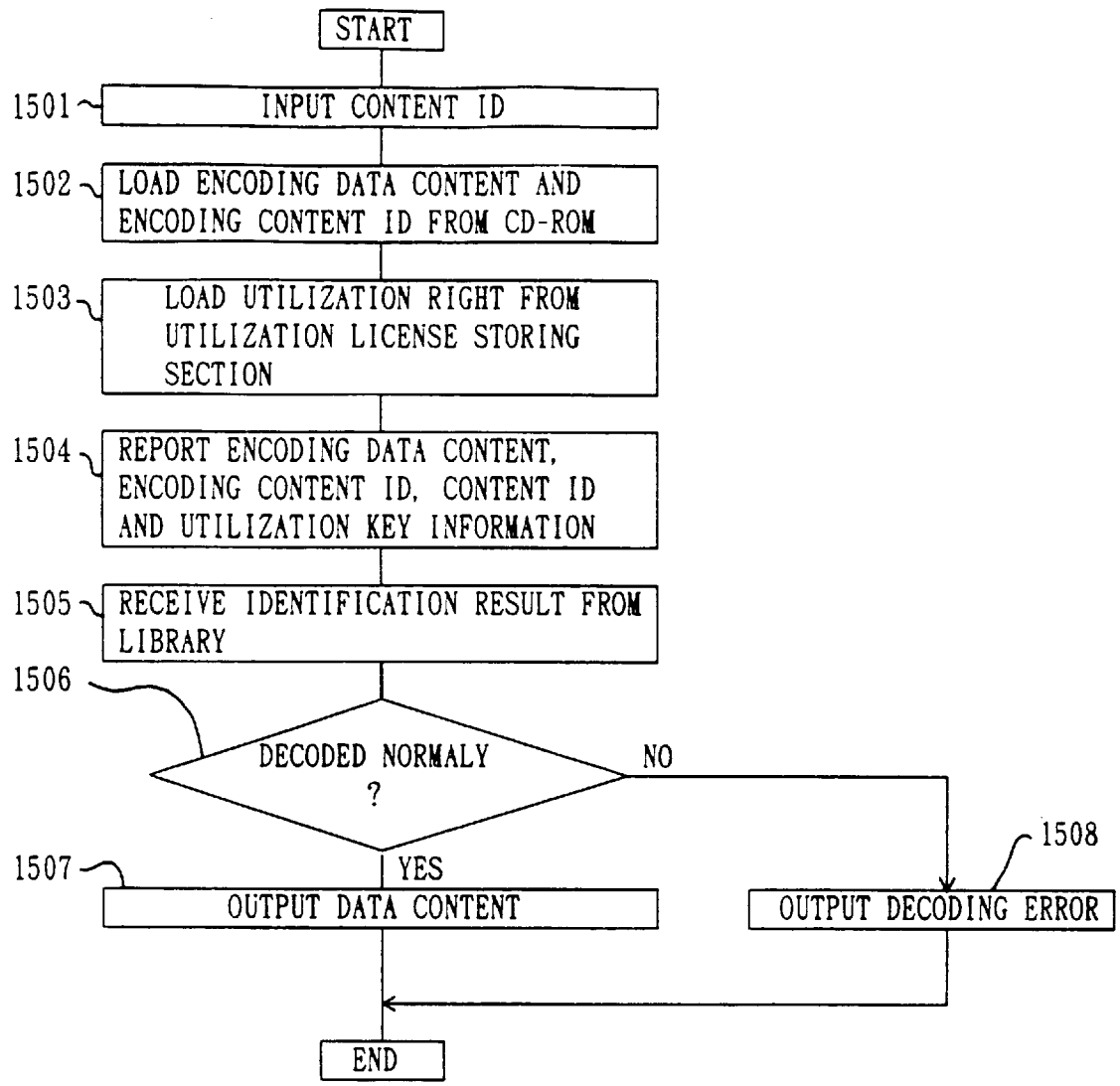
FIG. 15 is a flow chart showing the operation of a viewer according to the embodiment 2.

First, the operation of the viewer 100 will be described with reference to FIG. 15.

When the user inputs the content ID of data contents which he wants from the keyboard(step 1501), the data loading section 100a of the viewer 100 will retrieve encoded data contents and an encoded content ID from the CD-ROM 3 based on this content ID(step 1502). At the same time, the data loading section 100a will retrieve the utilization key information of the data contents from the utilization license storing section 4 based on the content ID (step 1503).

Then, the data loading section 100a will report the encoded data contents, the encoded content ID, the utilization key information and the content ID input by the user to the library 110(step 1504). At this time, the library 110 will execute decoding of the encoded data and the encoded content ID and report the result of comparing the decoded content ID and the content ID input by the user to the viewer 100.

Then, when receiving the comparing result from the comparing section 13 of the library 110(step 1505), the data outputting section 100b will recognize whether the decoding of the data contents has been finished normally or not(step 1506).

Here, if it finds that the decoding of the data contents has been correctly finished, the data outputting section 100b will output the data contents decoded by the library 110 from a TV monitor, a speaker, or a personal computer PC(step 1507).

At the step 1506, if it receives a report from the library saying that the decoding has not been normally finished, the data outputting section 100b will output a message indicating a decoding error from a TV monitor, a speaker or a personal computer PC(step 1508).

Figure 16:
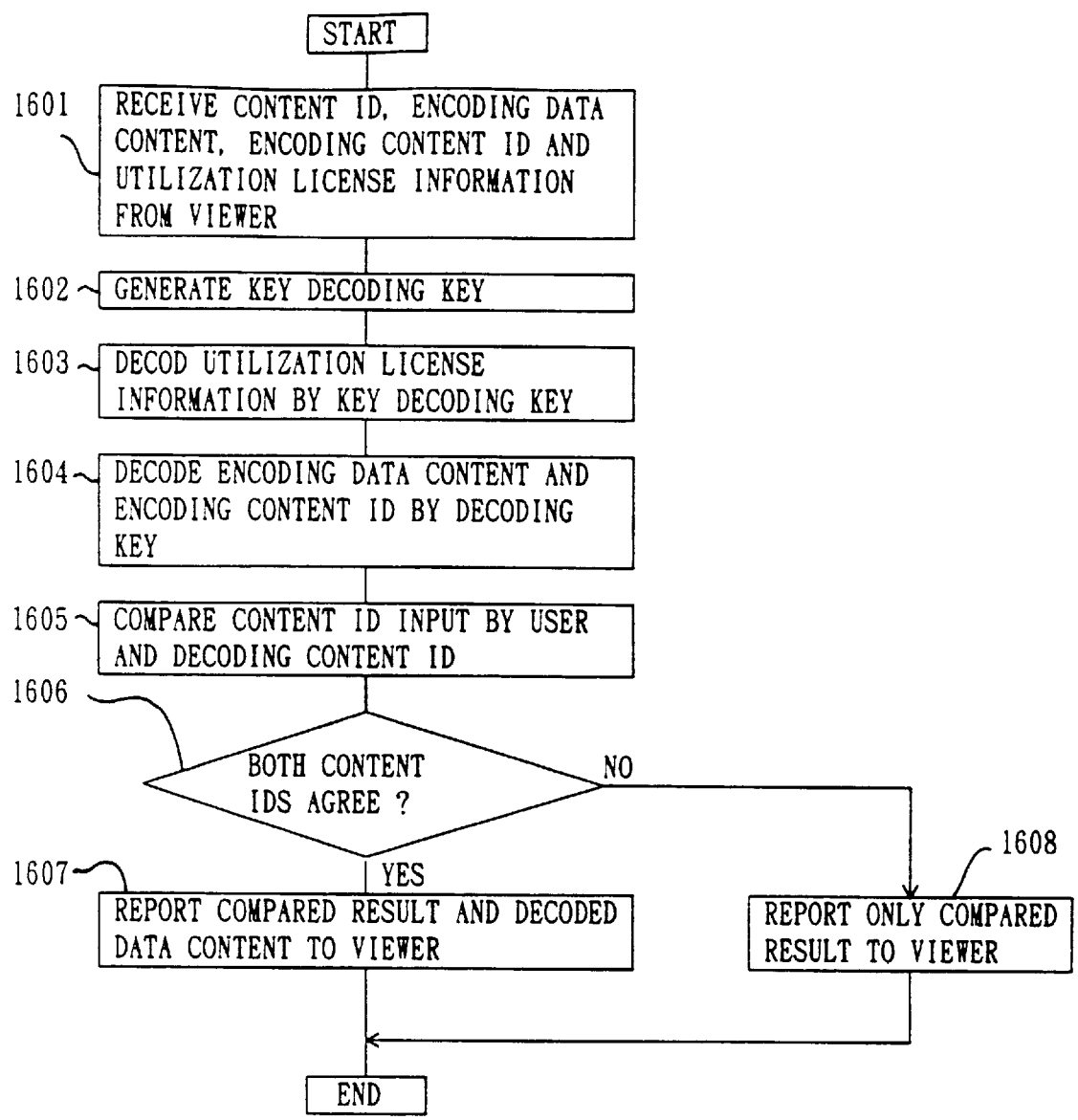
FIG. 16 is a flow chart showing the operation of a library according to the embodiment 5.

The operation of the library 110 will be described with reference to FIG. 16 hereinbelow.

At the library 110, when it receives a content ID, encoded data contents, encoded content ID and utilization license information from the viewer 100(step 1601), the converting section 11 of the key generating section 110b will generate a key decoding key by converting the CPU-ID of the control CPU 19c with a library key stored in the key registering section 10 and report it to the key decoding section 110c(step 1602).

The key decoding section 110c will decode the utilization license information received from the viewer 100 by a key decoding key generated by the key generating section 110b and generate a decoding key(step 1603).

Then, the decoding section 12 of the data decoding section 110d will decode the encoded data contents and the encoded content ID based on a decoding key generated by the key decoding section 110c(step 1604). At this time, the comparing section 13 will compare the content ID decoded by the decoding section 12 and the content ID input by the user(step 1605) and identify whether they coincide or not (step 1606).

Here, if they are found to be coincident, information indicating that the decoding has been correctly finished and the data contents will be reported to the viewer 100(step 1607).

At the step 1606, if they are found not to be coincident, that is, the decoding has not been correctly finished, the comparing section 13 will report only its comparing result to that effect to the viewer 100(step 1608).

According to the fifth embodiment of the present invention, by encoding a decoding key for decoding data contents based on a CPU-ID specific to the software reproducing device and a library key, it will be possible to prevent taking-out of the decoding key by the user without using a library and an SD circuit. Thus, it will also be possible to prevent illegal utilization of data contents by the user who has not bought a decoding key.

The data content utilizing system according to the sixth embodiment of the present invention, as similar to the fourth case of the embodiment, will be described taking as an example a system connecting a utilization permitting device 2 to a personal computer.

Also, the data content utilizing system according to the sixth embodiment will be described taking as an example a system wherein data contents are lent to a user and the user are charged depending on the amount of utilization.

Figure 17:
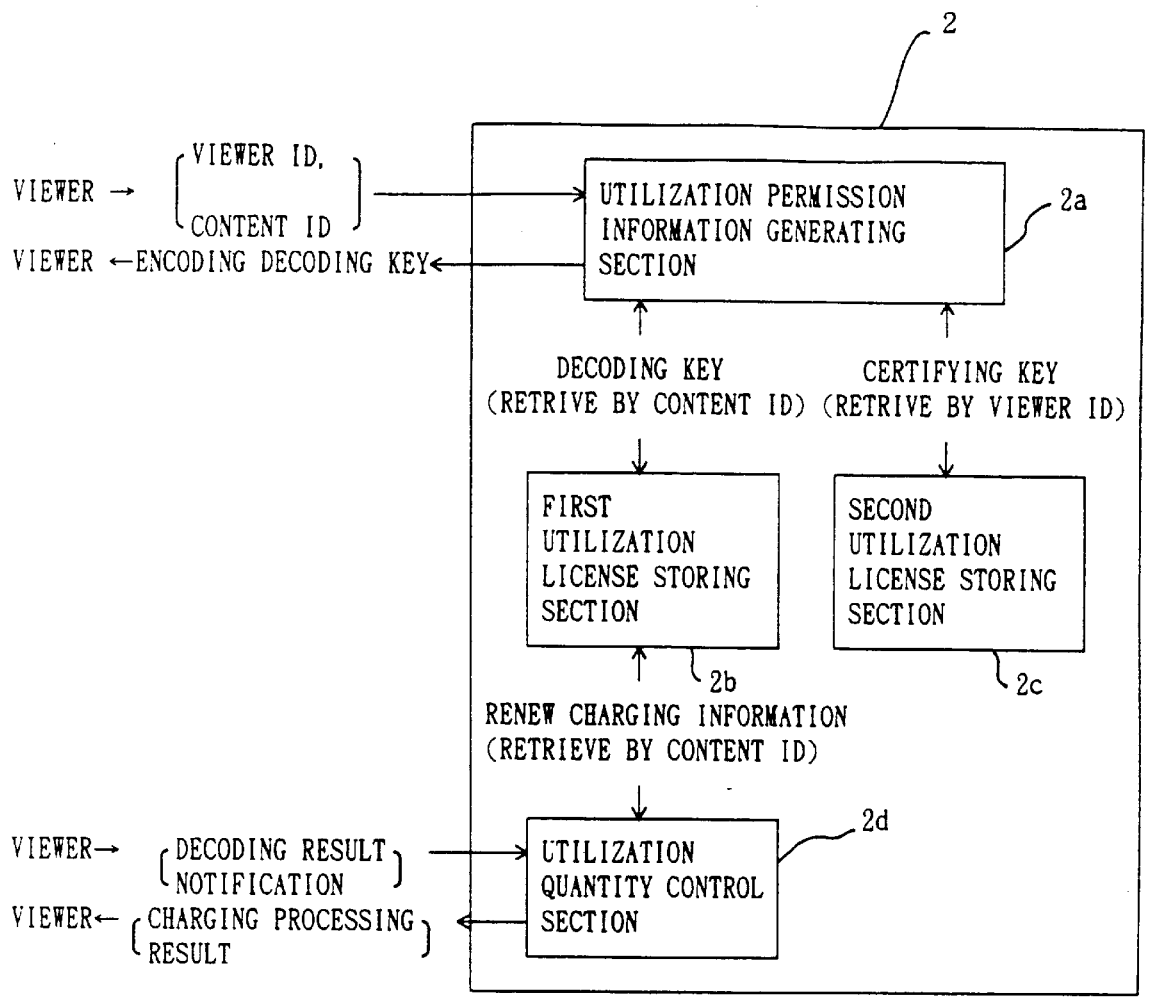
FIG. 17 is a block diagram showing the functional construction of a utilization permitting device according to the embodiment 6.

FIG. 17 shows the functional construction of the utilization permitting device according to the sixth embodiment of the present invention.

The utilization permitting device 2 according to the sixth embodiment includes a utilization permission information generating section 2a, a first utilization license storing section 2b, a second utilization license storing section 2c and a utilization quantity control section 2d.

The first utilization license storing section 2b stores charging information in addition to decoding key information for respective data contents at every content IDs. This charging information is stored corresponding to each of data contents, and it is point information from which subtraction is made whenever the user utilized the data. That is, subtraction is made from the charging information when the user decodes encoded data contents loaded from the storage medium 3. Then, when returning the data contents to the rental shop, the user will bring the utilization permitting device 2 and be charged after this charging information is decoded. Further, it is possible to connect the utilization permitting device 2 and the rental shop via communication lines, etc., and to send only the charging information thereto.

The utilization amount managing section 2d is for managing charging information stored in the first utilization license storing section 2b, having a function for subtracting "1" from the charging point of the data contents only when decoding of the data contents has been correctly finished and the user makes a request for utilizing them. Further, it is provided with a function for reporting the end of charging to a library 2 when the charging information is correctly renewed, that is, if the charging point after subtraction is over "0".

Figure 18:
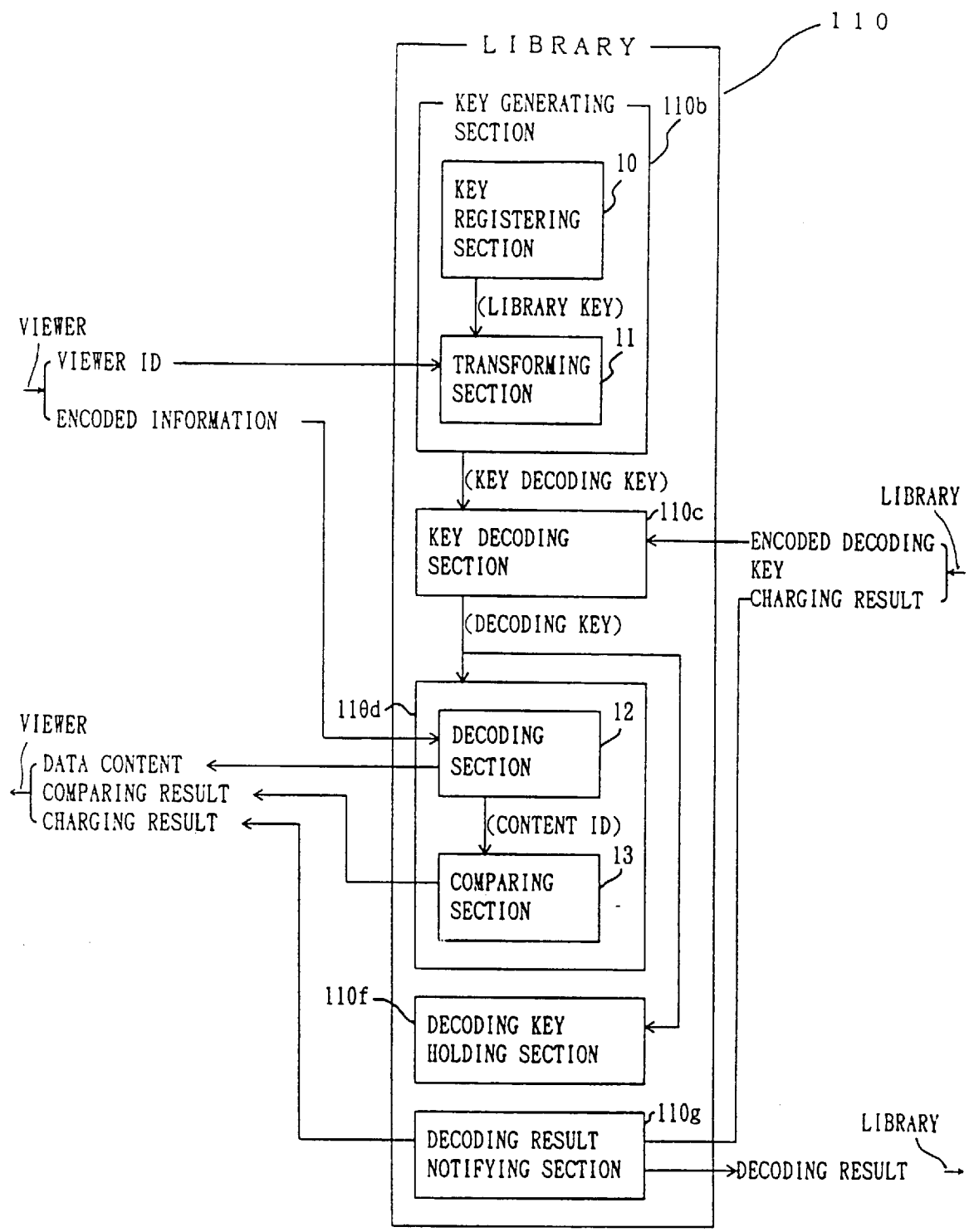
FIG. 18 is a block diagram showing the functional construction of a library according to the embodiment 6.

The functional construction of the library 10 according to the sixth embodiment is shown in FIG. 18.

As shown in FIG. 18, the library 110 includes a key generating section 110b, a key decoding section 110c, a data decoding section 110d, a decoding key holding section 110f and a decoding result reporting section 110g.

The key generating section 110b includes a key registering section 10 for registering a library key specifying its own library 110 and a converting section 11 for converting a viewer ID by a library key and generating a key decoding key.

The key decoding section 110c is provided with a function for decoding a encoded decoding key received from the utilization permitting device 2 by a key decoding key generated by the key generating section 110b.

The data decoding section 110d includes a decoding section 12 for decoding encoded data contents and a encoded content ID by decoding key information decoded by the key decoding section 110c and a comparing section 13 for comparing a content ID decoded by the decoding section 12 and a content ID input by the user and identifying whether decoding has been correctly finished or not. The comparing section 13 is provided with a function for giving parts of data contents decoded by the decoding section 12 and a message asking the user to select utilization or nonutilization of the data contents to the viewer 100 when decoding has been correctly carried out (if the content IDs coincide). It is also provided with a function for reporting only a decoding result to the viewer 100 when decoding has not been correctly carried out.

The decoding key holding section 110f is for registering decoding key information decoded by the key decoding section 110c, and the data decoding section 110d allows decoding of the data contents by a number of times based on the decoding key information as long as the decoding key information is held at the decoding key holding section 110f.

The decoding result reporting section 110g is provided with a function for a decoding result to the utilization permitting device 2 and requesting a charging processing when decoding has been correctly carried out and the user requests utilization of data contents. The utilization amount managing section 2d of the utilization permitting device 2 is to subtract "1" from the charging point of the data contents at the first utilization license storing section 2b.

Further, the decoding result reporting section 110g is provided with a function for reporting it to the viewer 100 when receiving a charging processing result from the utilization permitting device 2. The comparing section 13 will report all of the decoded data contents to the viewer 100 when it finds that a charging processing has been correctly carried out.

Furthermore, the decoding result reporting section 110g will not be made to report its decoding result to the utilization permitting device 2 in the case where the data decoding section 110d decodes data contents based on a decoding key stored in the decoding key holding section 110f. That is, no matter how many times decoding is carried out based on the decoding key stored in the decoding key holding section 110f, the utilization permitting device 2 will not make any subtraction from the charging point.

Description of the other constructions and functions will be omitted as they are similar to the case of the fourth embodiment.

The operation of the data content utilization control system according to the sixth embodiment will be described with reference to FIG. 6 hereinbelow.

First, as a part of the operation of the personal computer 40, the operation of the viewer 100 will be described with reference to FIG. 19.

When the user inputs the content ID of data contents which he want from the keyboard 7(step 1901), the data loading section 100a of the viewer 100 will retrieve encoded data contents and an encoded content ID from the storage medium 3 based on the content ID (step 1902).

Then, the data loading section 100a will report the encoded data contents, the encoded content ID, a viewer ID and the content ID input by the user to the library 110(step 1903).

Then, the data outputting section 100b will receive a decoding processing result from the library 110(step 1904).

Here, if the decoding processing has been correctly finished, the data outputting section 100b will output parts of the data contents decoded by the library 110 and a message asking the user to select utilization or nonutilization thereof from a display device 5 or a speaker 6(steps 1905, and 1906).

Here, if the user requests utilization of the data contents, the viewer 100 will report it to the library 110(step 1908).

Then, the data outputting section 100b of the viewer 100, upon receiving a report from the library 110 indicating that the charging processing of the data contents has been correctly finished(step 1909), will output all of the data contents decoded by the library 110 from the display device 5 or the speaker 6(step 1910).

On the other hand, if the decoding processing has not been correctly finished at the step 1905, the data outputting section 100b will output a message indicating a decoding error from the display device 5 or the speaker 6(step 1911).

If the charging processing has not been correctly finished at the step 1909, the data outputting section 100b will output a message indicating a charging error from the display device 5 or the speaker 6(step 1912).

Figure 20:
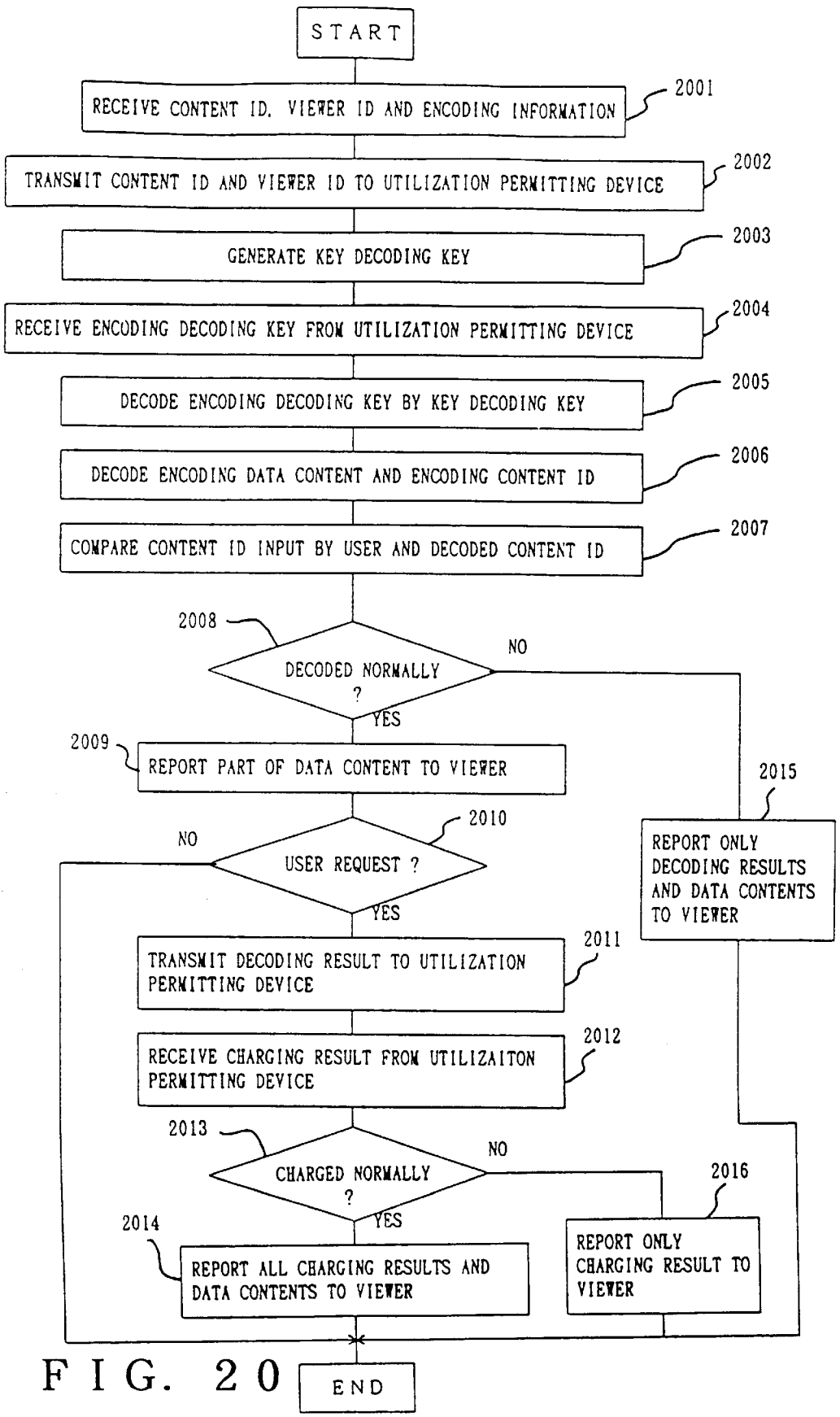
FIG. 20 is a flow chart showing the operation of a library according to the embodiment 6.

The operation of the library 110 will be described with reference to FIG. 20 hereinbelow.

The library 110, when receiving from the viewer a content ID, a viewer ID, encoded data contents and an encoded content ID(step 2001), will transmit the content ID ad the viewer ID to the utilization permitting device 2(step 2002).

The converting section 11 of the key generating section 10b will convert the viewer ID based on a library key stored in the key registering section 10 and generate a key decoding key information(step 2003).

Then, when receiving encoded decoding key information from the utilization permitting device 2(step 2004), the key decoding section 110c will decode the encoded decoding key by a key decoding key generated by the key generating section 110b(step 2005).

The decoding section 12 of the data decoding section 110c will decode the encoded data contents and the encoded content ID by a decoding key decoded by the key decoding section 110c(step 2006).

Here, the comparing section 13 will compare the content ID decoded by the decoding section 12 and the content ID input by the user(step 2007) and identify whether the decoding processing has been correctly finished or not(step 2008). When finding that it has been correctly finished, the comparing section 13 will report parts of the data contents and a message asking the user to select utilization or nonutilization of the data contents to the viewer 100(step 2009).

Then, when receiving a report that the user requests to utilize the data contents from the viewer 100(step 2010), the decoding result reporting section 110g will transmit normal finishing of the decoding processing to the utilization permitting device 2(step 2011).

Here, when the utilization permitting device 2 carries out the charging processing of the data contents and sends its result(step 2012), the decoding result reporting section 110g will report this charging processing result to the comparing section 13, and at the same time to the viewer 100.

If it finds that the charging processing has been correctly finished(step 2013), the comparing section 13 will report all of the decoded data contents to the viewer 100(step 2014).

On the other hand, if the decoding processing has not been correctly operated at the step 2008, the comparing section 13 will report only the decoding result to the viewer 100(step 2015).

Further, if the charging processing has not been correctly finished, the decoding result reporting section 110g will report the charging processing result to the viewer 100 while the comparing section 13 will transmit nothing(step 2016).

Figure 21:
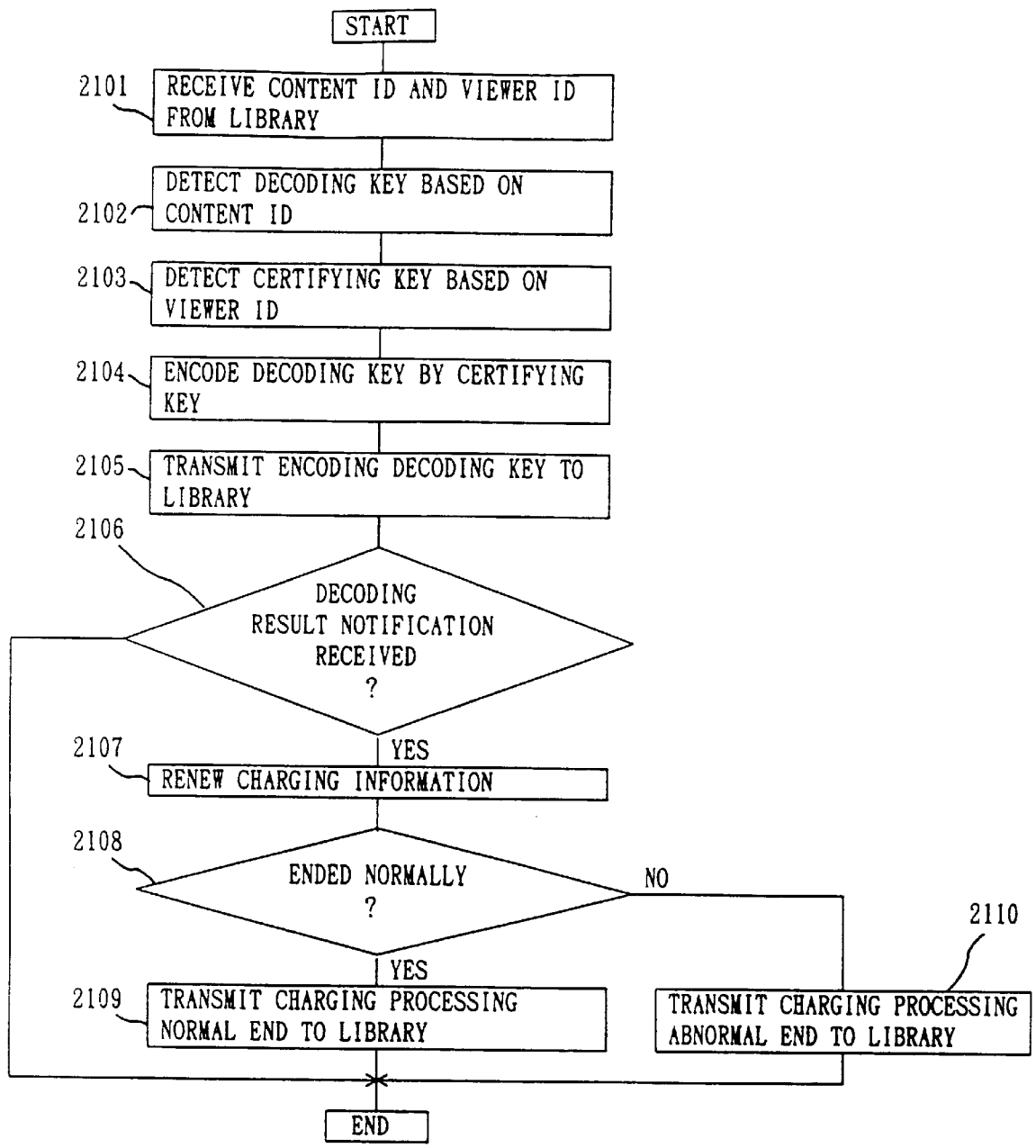
FIG. 21 is a flow chart showing the operation of a utilization permitting device according to the embodiment 6.

The operation of the utilization permitting device according to the sixth embodiment will be described with reference to FIG. 21.

The utilization permission information generating section 2a of the utilization permitting device 2, when receiving a content ID and a viewer ID from the library 10(step 2101), will retrieve the decoding key information of the data contents from the first utilization license storing section 2b based on the content ID (step 2102).

Further, the utilization permission generating section 2a will retrieve the certification key information of the viewer 100 from the second utilization license storing section 2c based on the viewer ID (step 2103). Here, it will encode the decoding key information based on the certification key information(step 2104), and transmit this encoded decoding key information to the library 110(step 2105).

Then, upon receiving a decoding result report from the library 110(step 2106), the utilization amount managing section 2d will identify whether the decoding processing has been correctly finished or not from this report(step 2107).

Here, if it finds that the decoding has been correctly finished, the utilization amount managing section 2d will access to the first utilization license storing section 2b based on the content ID and decrement "1" from the charging point of the data contents(step 2108). Then, it will identify whether the charging point after the subtraction is negative or not and whether the charging processing has been correctly finished or not(step 2109).

On the other hand, if the charging processing has not been correctly finished, this will be reported to the library 110 (step 2111).

According to the sixth embodiment, it will be possible to prevent filing of data by providing a viewer specialized for outputting data contents.

Further, by encoding decoding key information with both a certification key for each viewer and a library key specific to a library, it will be possible to prevent the user from decoding and thereby to prevent illegal utilization of data contents.

Further, according to the sixth embodiment, by holding a decoding key it will be possible to carry out decoding any number of times as long as this decoding key is held.

Further, according to the system in the sixth embodiment, it will be possible not only to carry out charging for renting of data contents but also to provide better services by providing parts of decoded data contents to the user and carrying out charging if they are really what the user requests.

Furthermore, in the sixth embodiment, it may be possible to encode charging information, etc., before it is transmitted and received between the library 110 and the utilization permitting device 2.

What is claimed is:

1. A data content utilizing device comprising:

data storing means for storing information obtained by encoding data contents and content identification information specifying the data contents;

a utilization permitting device for generating utilization permission information used to decode data contents desired by a user; and information converting means for loading the data contents desired by the user from said data storing means and decoding the data contents by using utilization permission information generated by said utilization permitting device, said information converting means comprising:

a data loading section loading data content desired by the user from said data storing means, a key generating section for a key decoding key by using information converting means identification information specifying individual information converting means, a key decoding section generating a decoding key used to decode said data contents on the basis of said key decoding key and utilization permission information obtained from said utilization permitting device, and a data decoding section decoding said data contents by said decoding key.

2. A data content utilizing device comprising:

data storing means for storing information obtained by encoding data contents and content identification information specifying the data contents;

a utilization permitting device for generating utilization permission information used to decode data contents desired by a user; and information converting means for loading the data contents desired by the user from said data storing means and decoding the data contents by using utilization permission information generated by said utilization permitting device, said utilization permitting device comprising a utilization permission information generating section receiving at least information converting means identification information and content identification information from said information converting means, and generating utilization permission information using the at least information converting means identification information and the content identification information.

3. The data content utilizing device according to claim 1, wherein said key generating section comprises:

a key registering section for registering specified key information; and a converting section for converting said information converting means identification information by a key stored in said key registering section and generating a key decoding key.

4. The data content utilizing device according to claim 1, wherein said data decoding section comprises:

a decoding section for decoding said encoded data contents and said encoded content identification information by using a decoding key generated by said key decoding section;

and a comparing section for comparing data content identification information decoded by said decoding section and content identification information to be input by a user and outputting said data contents only when both of the identification information coincide with each other.

5. The data content utilizing device according to claim 4, wherein said comparison section outputs a part of said data contents and a message urging a user to make a selection as to whether or not he wishes to utilize said data contents when the content identification information decoded by said decoding section and the content identification information inputted by said user coincide with each other and outputs all of said data contents if the user desires to utilize said data contents.

6. The data content utilizing device according to claim 4, wherein said comparison section outputs decoding error in the case where the content identification information decoded by said decoding section and the content identification information inputted by said user do not coincide with each other.

7. A data content utilizing device comprising:
    data storing means for storing information obtained by encoding data contents and content identification information specifying the data contents;
    a utilization permitting device for generating utilization permission information used to decode data contents desired by a user; and
    information converting means for loading the data contents desired by the user from said data storing means and decoding the data contents by using utilization permission information generated by said utilization permitting device, wherein:
        a random number generating section for outputting random numbers is included in one of said information converting means and said utilization permitting device; and
        said utilization permitting device generates utilization permission information by using information converting means identification information, content identification information, and random numbers output by said random number generating section.

8. The data content utilizing device according to claim 2, wherein:
    a random number generating section for outputting random numbers is provided on either of said information converting means or said utilization permitting device; and
    said utilization permitting device is provided with a first utilization license storing section for storing a decoding key used to decode data contents for each content identification information and a second utilization license storing section for storing the certification key of information converting means for each information converting means identification information;
    said utilization permission information generating section retrieves a decoding key corresponding to said content identification information from said first utilization license storing section, when it receives content identification information and information converting means identification information;
    said utilization permission information generating section retrieves a certification key corresponding to said information converting means identification information from said second utilization license storing section; and
    said utilization permission information generating section encodes said decoding key by using said certification key and random numbers generated by said random number generating section and generates utilization permission information which is the encoded decoded key.

9. A data content utilizing device, comprising:
    data storing means for storing information made by encoding data contents and content identification information specifying the data contents;
    a utilization license storing section for storing a utilization key for each content identification information used to identify individual data contents; and
    information converting means for loading data contents desired by a user from said data storing means and loading a utilization key corresponding to said content identification information from said utilization license storing section and outputting said data contents after decoding them by this utilization key and device identification information specific to a device owned by a user.

10. The data content utilizing device according to claim 9, wherein said information converting means comprises:
    a data loading section for loading data contents desired by a user from said data storing section and loading a utilization key corresponding to said content identification information from said utilization license storing section;
    a key generating section for generating a key decoding key by using device identification information specific to a device owned by a user;
    a key decoding section for generating a decoding key used to decode said encoded data contents using said key decoding key and said utilization key;
    and a data decoding section for decoding said data contents by said decoding key.

11. The data content utilizing device according to claim 10, wherein said key generating section comprises:
    a key registering section for registering specified key information;
    and a converting section for converting said device identification information by using a key stored in said key registering section and generating a key decoding key.

12. The data content utilizing device according to claim 10, wherein said data decoding section comprises:
    a decoding section for said encoded data contents and said encoded content identification information by using a decoding key generated by said key decoding section;
    and a comparison section for comparing the content identification information decoded by said decoding section and the content identification information inputted by a user and outputting said data contents as long as both of the identification informations coincide with each other.

13. A data content utilizing device, comprising: data storing means for storing information made by encoding data contents and content identification information;
    a utilization permitting device for generating utilization permission information used to decode data contents desired by a user and managing the charging information of said data contents; and
    information converting means for loading data contents desired by a user from said data storing means and decoding them by utilization permission information obtained from said utilization permitting device.

14. The data content utilizing device according to claim 13, wherein said information converting means comprises:
    a data loading section for loading data contents desired by a user from said data storing section;
    a key generating section for generating a key decoding key by using information converting means identification information specifying individual information converting means;

a key decoding section for generating a decoding key used to decode said encoded data contents using said key decoding key and utilization permission information obtained from said utilization permitting device;

a data decoding section for decoding said data contents by said decoding key;

and a decoding result reporting section for reporting to said utilization permitting device whether said data contents have been normally decoded or not.

15. The data content utilizing device according to claim 14, wherein said utilization permitting device comprises:

a utilization permission information generating section for receiving at least information converting means identification information and content identification information from said information converting means and generating utilization permission information based on these pieces of information;

and a utilization amount managing section for renewing the charging information of said data contents if decoding has been normally carried out when receiving a decoding result from said information converting means.

16. The data content utilizing device according to claim 14, wherein said key generating section comprises:

a key registering section for registering specified key information;

and a converting section for converting said information converting means identification information by a key stored in said key registering section and generating a key decoding key.

17. The data content utilizing device according to claim 14, wherein said data decoding section comprises:

a decoding section for decoding said encoded data contents and said encoded content identification information by a decoding key generated by said key decoding section;

and a comparison section for comparing content identification information decoded by said decoding section and content identification information inputted by a user and identifying whether or not they coincide or not.

18. The data content utilizing device according to claim 15, wherein:

a random number generating section for generating random numbers is provided on said information converting means or said utilization permitting device; and said utilization permission information generating section generates utilization permission information using said information converting means identification information, content identification information and random numbers outputted by said random number generating section.

19. The data content utilizing device according to claim 13, wherein said utilization permitting device comprises:

a utilization permission information generating section for receiving at least information converting identification information and content identification information from said information converting means and generating utilization permission information by using these pieces of information;

a first utilization license storing section for registering a decoding key used to decode data contents for each content identification information; and a second utilization license storing section for storing a certification key of information converting means for each information converting means identification information, and said utilization permission information generating section, when receiving content identification information and information converting means identification information from said information converting means, retrieves decoding key corresponding to said content identification information from said first utilization license storing section based on said content identification information, and retrieves the certification key of said information converting means from said second utilization license storing section based on said information converting means identification information, and outputs said decoding key to said information converting means after encoding it by said certification key.

20. The data content utilizing device according to claim 14, wherein said utilization permitting device comprises:

a utilization permission information generating section for receiving at least information converting means identification information and content identification information from said information converting means and generating utilization permission information using these pieces of information;

a first utilization license storing section for storing a decoding key used to decode data contents for every content identification information and the charging information of data contents;

a second utilization license storing section for storing a certification key of information converting means for every information converting means identification information;

and a utilization amount managing section for renewing the charging information of said data contents if decoding has been correctly carried out when receiving a decoding result from said information converting means, and said utilization amount managing section, when receiving a decoding result from said decoding result reporting section, identifies whether said data contents have been correctly decoded or not, renews the charging information stored in said first utilization license storing section if it finds that the decoding has been correctly done, and reports information indicating whether or not the renewal of the charging information has been normally carried out to said information converting means.

21. The data content utilizing device according to claim 20, wherein said information converting means, when receiving information indicating whether charging information has been renewed or not from said utilization permitting device, outputs said data contents in the case where it finds that said pieces of content identification information coincide with each other and the charging information has been correctly renewed by consulting the information received therefrom and the comparing result of said comparing section;

it outputs a charging error if it finds that said pieces of content identification information coincide with each other but the charging information has not been correctly carried out; and it outputs a decoding error if it finds that said pieces of content identification information do not coincide with each other.

22. The data content utilizing device according to claim 20, wherein:

said comparison section outputs a part of said data contents and a message urging a user to select utilization or nonutilization of said data contents in the case where content identification information decoded by said decoding section and content identification information input by the user are found to be coincident with each other;

said decoding result reporting section reports said decoding result and information used to identify whether the user requests utilization or not to said utilization amount managing section;

and said utilization amount managing section refers to said decoding result and said information identifying whether or not the user desires to utilize and renews the charging information stored in said first utilization license storing section only when said data contents have been correctly decoded and the user desires to utilize the information.

23. The data content utilizing device according to claim 22, wherein said information converting means comprises a decoding key holding section for holding a decoding key decoded by said key decoding section, and said decoding section decodes said data contents any number of times as long as said decoding key holding section holds said decoding key while said utilization amount managing section does not renew the charging information stored in said first utilization license storing section.

24. A data content utilizing method comprising the steps of:

a utilization permitting step for generating permission information used to give permission to utilization of data contents desired by a user; and an information converting step for loading data contents requested by the user from a data storing means for storing information made by encoding data contents and data content identification information specifying the data contents and decoding the data contents and the data content identification information by using said utilization permission information, wherein said utilization permitting step comprises a utilization permission information generating step for generating utilization permission information by using at least information converting means identification information and the data content identification information.

25. A data content utilizing method comprising the steps of:

a utilization permitting step for generating permission information used to give permission to utilization of data contents desired by a user;

an information converting step for loading data contents requested by the user from a data storing means for storing information made by encoding data contents and data content identification information specifying the data contents and decoding them by using said utilization permission information;

a data loading step for loading data contents requested by a user from said data storing means;

a key generating step for generating a key decoding key by using information converting means identification information specifying a device for executing said information converting step;

a key decoding step for generating a decoding key used to decode said data contents on the basis of said key decoding key and said utilization permission information; and a data decoding step for decoding said data contents by said decoding key, wherein said key generating step further comprises the steps of:

a key loading step for loading a key from a key registering section storing specified keys, and a converting step for converting said information converting means identification information by a key loaded at said key loading step and generating a key decoding key.

26. The data content utilizing method according to claim 25, wherein said data decoding step comprises:

a decoding step for decoding said encoded data contents and said encoded content identification information using a decoding key generated at the key decoding step;

and a comparison step for comparing the content identification information decoded at said decoding step and the content identification information inputted by a user and outputting said data contents if they coincide with each other.

27. The data content utilizing method according to claim 26, wherein said comparison step comprises:

a step for outputting parts of said data contents and a message urging the user to select utilization or nonutilization thereof when the content identification information decoded at said decoding step and the content identification information inputted by the user are found to be coincident with each other;

and a step for outputting all of said data contents if the user desires utilization thereof.

28. The data content utilizing method according to claim 26, wherein said comparison step comprises a step for outputting a decoding error if the content identification information decoded at said decoding step and the content identification information inputted by the user are found not to be coincident with each other.

29. A data content utilizing method comprising the steps of:

a utilization permitting step for generating permission information used to give permission to utilization of data contents desired by a user;

an information converting step for loading data contents requested by the user from a data storing means for storing information made by encoding data contents and data content identification information specifying the data contents and decoding them by using said utilization permission information;

a random number generating step for generating random numbers, wherein said utilization permitting step comprises a step for generating utilization permission information by using information converting means identification information, content identification information and random numbers generated during said random number generating step.

30. The data content utilizing method according to claim 24, which comprises a random number generating step and wherein said utilization permission information generating step further comprises:

a step for receiving content identification information and information converting means identification information from said information converting means;

a step for retrieving a decoding key corresponding to said content identification information from a first utilization license storing section for storing a decoding key used to decode data contents for each content identification information;

a step for retrieving a certification key corresponding to said information converting means identification information from a second utilization license storing section storing a certification key of information converting means for each information converting means identification information;

and a step for encoding said decoding key by using said certification key and random numbers generated at said random number generating step and generating utilization permission information.

31. A data content utilizing method, comprising:

a data loading step for retrieving data contents corresponding to said data content identification information from a data storing means for storing information made by encoding data contents and content identification information specifying the data contents when a user inputs the identification information of data contents which he desires;

a utilization key loading step for loading a utilization key corresponding to said content identification information from a utilization license storing section storing utilization keys for each content identification information used to identify individual data contents;

a key generating step for generating a key decoding key using device identification information specific to a device owned by the user;

a key decoding step for generating a decoding key used to decode said data contents using said key decoding key and said utilization key;

and a data decoding step for decoding said data contents by said decoding key.

32. The data content utilizing method according to claim 31, wherein said key generating step further comprises a converting step for loading a key from a key registering section registering specified key information and generating a key decoding key by converting said device identification information by using said key.

33. The data content utilizing method according to claim 31, wherein said decoding step further comprises:

a decoding step for decoding said encoded data contents and said encoded content identification information by using a decoding key generated at said key decoding step;

and a comparison step for comparing content identification information decoded at said decoding step and content identification information inputted by a user and outputting said data contents only when they coincide with each other.

34. The data content utilizing method comprising the steps of:

a utilization permitting step for generating utilization permission information used to give permission to utilization of data contents which a user requests and managing the charging information of said data contents; and an information converting step for loading data contents desired by a user from a data storing means storing information made by encoding data contents and data content identification information specifying the data contents and decoding them using said utilization permission information, said information converting step further comprising the steps of:

a data loading step for loading data contents desired by a user from said data storing means, a key generating section for generating a key decoding key by using information converting means identification information specifying a device used to execute said information converting step, a key decoding step for generating a decoding key used to decode said encoded data contents by using said key decoding key and said utilization permission information, and a data decoding step for decoding said data contents by said decoding key.

35. The data content utilizing method according to claim 34, wherein said utilization permitting step further comprises:

a utilization permission information generating step for generating utilization permission information by using at least information converting means identification information and content identification information; and a utilization amount managing step for renewing the charging information of said data contents in the case where said data contents were correctly decoded at said decoding step.

36. The data content utilizing method according to claim 34, wherein said key generating step further comprises a converting step for loading a key from a key registering section registering specified key information, converting said information converting means identification information by said key and generating a key decoding key.

37. The data content utilizing method according to claim 34, wherein said data decoding step further comprises:

a decoding step for decoding said encoded data contents and said encoded content identification information by a decoding key generated at said key decoding step; and a comparison step for identifying whether or not content identification information decoded at said decoding step and content identification information inputted by a user are coincident with each other.

38. The data content utilizing method according to claim 35, which comprises a random number generating step for generating random numbers and wherein said utilization permission information generating step further includes a step for generating utilization permission information by using said information converting means identification information, said content identification information and said random numbers.

39. The data content utilizing method according to claim 35, wherein said utilization permission information generating step further comprises:

a step for retrieving a decoding key corresponding to content identification information from a first utilization license storing section registering a decoding key used to decode data contents for each content identification information;

a step for retrieving a certification key corresponding to said information converting means identification information from a second utilization license storing section storing a certification key of information converting means for each information converting means identification information; and a step for encoding said decoding key by said certification key and generating utilization permission information.

40. The data content utilizing method according to claim 35, wherein said utilization permitting step further comprises:

a utilization permission information generating step for generating utilization permission information by using information converting means identification information and content identification information;

a utilization amount managing step for renewing charging information stored in a first utilization license storing section storing a decoding key used to decode data contents for each content identification information and the charging information of data contents in the case where data contents were correctly decoded at said information converting step.

41. The data content utilizing method according to claim 37, wherein said information converting step further comprises:

a step for identifying whether or not the charging information has been correctly renewed at said utilization permitting step;

a step for outputting said data contents in the case where the pieces of content identification information do not coincide with each other at said comparison step and the charging information is not correctly renewed at said utilization permitting step;

a step for outputting a charging error in the case where the pieces of content identification information do not coincide with each other at said comparison step but at said utilization permitting step the charging information is not correctly renewed; and a step for outputting a decoding error in the case where the pieces of content identification information do not coincide with each other at said comparison section.

42. The data content utilizing method according to claim 40, wherein:

said comparison step further comprises a step for outputting a part of said data contents and a message urging the user to select utilization or nonutilization thereof in the case where the content identification information decoded at said decoding step and the content identification information inputted by the user do not coincide with each other; and said utilization amount managing step further comprises a step for renewing charging information stored in said first utilization license storing section only in the case where said data contents are normally decoded and there is a request of utilization from the user.

43. The data content utilizing method according to claim 42, wherein as long as a decoding key holding section for holding a decoding key holds said decoding key decoded at said key decoding step, at said data decoding step said data contents are allowed to be decoded any number of times while at said utilization amount managing step charging information stored in said first utilization license storing section is not renewed.

* * * * *